United States Patent [19]
Morawski et al.

[11] Patent Number: 5,991,023
[45] Date of Patent: Nov. 23, 1999

[54] METHOD OF INTERPRETING SPECTROMETRIC DATA

[75] Inventors: Roman Z. Morawski, Warsaw, Poland; Andrzej Barwicz; Mohamed B. Slima, both of Trois-Rivières, Canada; Andrzej Miekina, Warsaw, Poland

[73] Assignee: Measurement Microsystems A-Z Inc., Trois-Rivières, Canada

[21] Appl. No.: 09/081,440

[22] Filed: May 19, 1998

Related U.S. Application Data

[60] Provisional application No. 60/046,944, May 19, 1997.

[30] Foreign Application Priority Data

Aug. 8, 1997 [CA] Canada ................................. 2121776

[51] Int. Cl.⁶ ........................................ G01J 3/28
[52] U.S. Cl. ........................................ 356/326
[58] Field of Search ................... 356/326, 328, 356/301, 330–334; 250/339.13, 339.07, 339.01, 338.5; 702/28

[56] References Cited

U.S. PATENT DOCUMENTS

| | | |
|---|---|---|
| 5,420,687 | 5/1995 | Kachanov . |
| 5,448,070 | 9/1995 | Day et al. . |
| 5,543,916 | 8/1996 | Kachanov . |
| 5,644,125 | 7/1997 | Wobschall . |
| 5,657,404 | 8/1997 | Buchanan et al. . |
| 5,712,710 | 1/1998 | Karakus et al. . |
| 5,731,874 | 3/1998 | Maluf . |

*Primary Examiner*—K P Hantis
*Attorney, Agent, or Firm*—Neil Teitelbaum & Associates

[57] ABSTRACT

A method for spectral measurement is disclosed. The method uses a low-resolution grating to disperse light and thereby image a spectrum thereof. The imaged spectrum is converted into a digital electrical signal and is processed in order to enhance the spectral information. The resulting spectral information is analogous to that captured using a higher resolution spectral imager with optical processing of the spectral data. The method is equally applicable to enhancing resolution of spectra captured using high resolution spectral imaging devices.

18 Claims, 23 Drawing Sheets

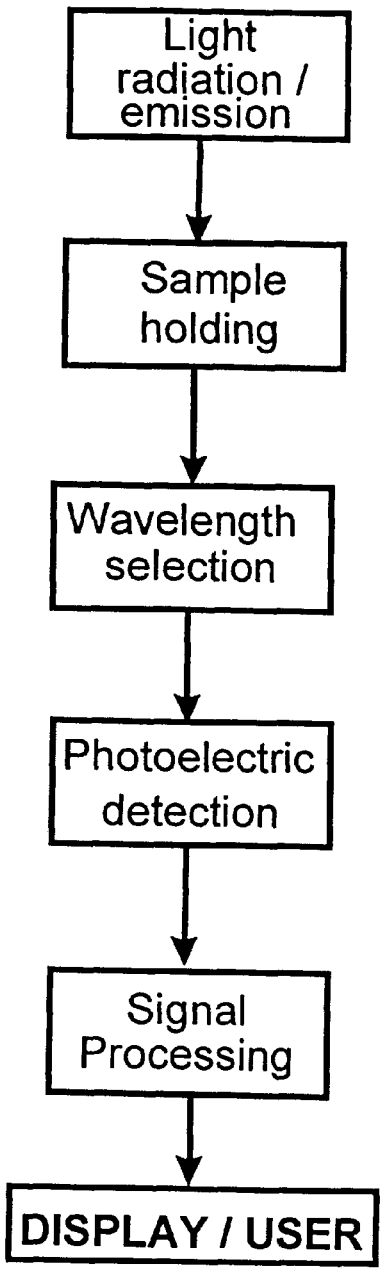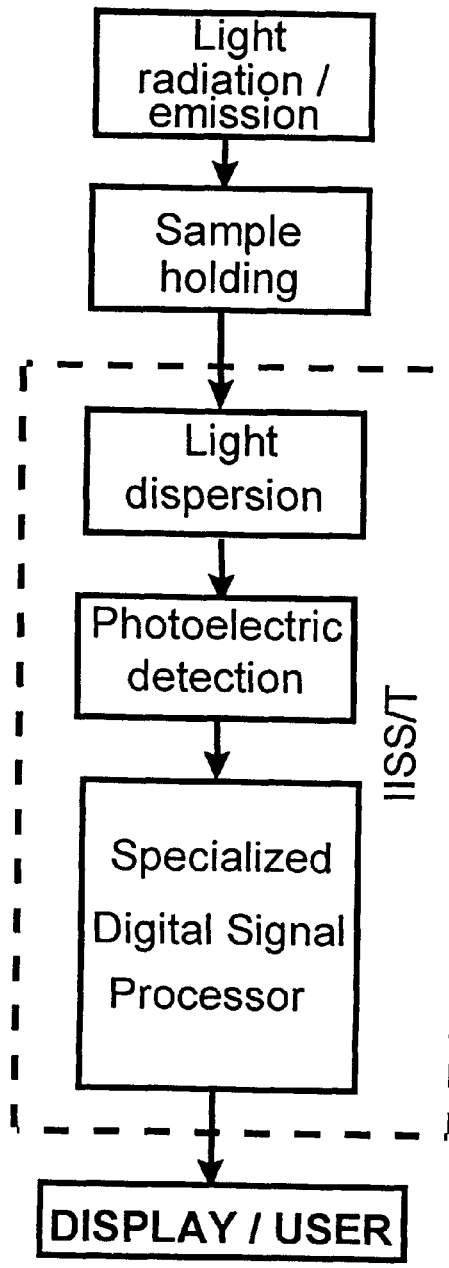
Figure 2a
(Prior Art)
Figure 2b

METHOD OF INTERPRETING SPECTROMETRIC DATA

This application claims benefit of Provisional Application 60/046,944 filed May 19, 1997.

FIELD OF INVENTION

This invention relates generally to light-spectrum-measurements and more specifically to a method of enhancing spectral resolution of an imaged spectrum.

BACKGROUND OF THE INVENTION

Increasingly accurate yet fast methods and instrumentation for measuring various quantities are required in environmental analysis and technologies, in industrial monitoring, in diagnostics for health care, and in pharmacology. Some of these requirements are outlined in Parker S. (Ed.): *McGraw-Hill Encyclopedia of Chemistry*, McGraw-Hill, 1983, and in D. A. Skoog and J. J. Leary, *Principles of Instrumental Analysis*, $4^{th}$ edition, Harcourt Brace College Publishers, New York, USA, 1992. For example, in environmental applications, there is a need for integrated and miniaturized measurement tools which can be used directly at sites where measurements are important (factory exits, waste, dumps etc.), and to transmit continually, without cable connection, the information necessary for real-time monitoring to the centers for pollution prevention or waste management. Amongst the most widespread methods for identification of the pollutants are those of spectrometry and in particular of absorption spectrophotometry. Numerous examples of existing needs for light-spectrum-measurement based in situ applications are described in the prior art.

Spectroscopy is an analytic technique concerned with the measurement and characterization of the interaction of radiant energy with matter. This often involves working with instruments designed for this purpose, called spectrometers, and corresponding methods of interpreting the interaction both at the fundamental level and for practical analysis. The distribution of radiant energy, absorbed or emitted by a sample of a substance under study, is called its spectrum. If energy of ultraviolet (UV), visible (Vis) or infrared (IR) light is used, the corresponding spectrum is called a light-spectrum. In the description, which follows, the term spectrum is used in the sense of light-spectrum and the term spectrometer is used in the sense of spectrophotometer.

A spectrometer has a resolution associated with its design or implementation affecting resolution of measured spectra. As is well understood by those of skill in the art of spectrometry, a required resolution for UV and a required resolution for IR spectral imaging is different. Further, the terms high-resolution and low-resolution are related to an imaged spectral band or to wavelengths of light within the imaged band. For a broadband spectrometer, either graduated spectral resolution or a spectral resolution sufficient to properly image each band is used.

Interpretation of spectra provides fundamental information at atomic and molecular energy levels. For example, the distribution of species within those levels, the nature of processes involving change from one level to another, molecular geometries, chemical bonding, and interaction of molecules in solution are all studied using spectrum information. Practically, comparisons of spectra provide a basis for the determination of qualitative chemical composition and chemical structure, and for quantitative chemical analysis as disclosed in Parker S. (Ed.): *McGraw-Hill Encyclopedia of Chemistry*, McGraw-Hill, 1983 which is hereby incorporated by reference.

Referring to information from that text, a general functional block diagram of a spectrometer is shown in FIG. 1 and contains five components:

- a stable source of radiant energy;
- a transparent container for holding the sample of the substance for analysis;
- a device that isolates a restricted region of the spectrum for measurement;
- a radiation detector which converts radiant energy to a usable signal in the form of an electrical signal; and,
- a signal processor and readout, which displays the electrical signal on a meter scale, a cathoderay tube, a digital meter, or a recorder chart.

The modem spectrometers are very sophisticated and guarantee excellent measurement performance in a laboratory environment, but in situ applications of spectrometers are only made in exceptional circumstances, since they require relatively expensive equipment, which is usually transported in special vehicles.

In general, the precision of spectrometers is considered adequate for most laboratory applications and, therefore, recent efforts in improving spectrometers have focused on improving in situ usability.

The miniaturization of spectrometers is a necessary precondition for their mass in situ application; however, the size of a spectrometer is limited by required precision and accuracy of measurements because of existing relations between optical spectral resolution, spectral range of a spectrometer and its physical dimensions. The optical spectral resolution of commonly manufactured spectrometers is proportional to their dimensions. This is a noted and important limitation for miniaturization of spectrometers, which heretofore could not be circumvented. Unfortunately, since precise spectrometers for use in environmental analysis are often bulky, costly, and expensive to transport and install, many known and important applications of spectrometers remain unimplemented due to cost and/or inconvenience. A portable spectrometer that has a lower cost than conventional spectrometers and is preferably hand-held would allow the use of spectrometers in a wide range of applications to the benefit of many industries.

Existing spectrometers, which could be adapted to in situ measurements, are relatively large and expensive. Companies such as Ocean Optics, CVI Laser Corporation, and Control Data offer miniaturized PC-compatible, on-card spectrometers whose price ranges between $6,000 and $20,000. These spectrometers are commonly intended for laboratory applications and offer interesting metrological characteristics. Some other companies offer portable autonomous spectrometers for measuring specific substance contents (e.g. Clean Earth). Their dimensions are relatively large and prices reach several thousands US Dollars. Attempts to implement the optical functions using semniconductor-based integration technologies have resulted in lower quality of operation over that-obtained by means of classic discrete technologies. Therefore, an autonomous, integrated spectrum-measurement-based tools for UV-Vis-IR range are still not available.

Recently, increased research activity is directed towards developing spectrometers for sensing applications and for wavelength division multiplexing (WDM) in optical communication; however, a simple low cost solution with a totally integrated opto-electronic part using standard technologies is still lacking. A variety of spectrometric probes for in situ measurement are known in the art. U.S. Pat. No. 5,712,710 for example, describes a probe for use in measuring the concentration of a specific metal ion dissolved in liquid. The device suffers from known problems of probe miniaturization. Either the bandwidth og the spectrometer is narrow to accommodate a small probe size, the quality of the spectral imaging is poor, or the optical processing components are large and costly. The device comprises a hand-held processing unit coupled to the probe. The processing unit is programmed to calculate and display the concentration of a specific material. In this probe, neither the photodetector nor the processing unit are integrated with the light diffraction structure. Further, the use of poor resolution in imaging the spectrum is unacceptable for most applications when using such a probe.

U.S. Pat. No. 5,020,910 describes a method of forming a light diffraction structure directly over a photodetector. The device requires external electronic circuitry to obtain a useful spectrum of light and the spectral resolution is very high in comparison to that of existing conventional spectrometers. U.S. Pat. No. 5,731,874 describes a spectrometer with an integrated photodetector. This device is sensitive only to particular spectral lines and thus is useful over a narrow spectral range.

In U.S. Pat. No. 5,742,389, Zavislan et al. disclose a Spectrophotometer and Electro-Optic Module Especially Suitable for Use Therein. The device incorporates a grating that is moveably mounted within a small housing that is capable of being held. The disclosed device concerns itself with alignment of optical components and the detector, but does not address resolution.

None of the above-described approaches permits manufacture a low cost high-resolution hand-held spectrometer. These known small spectrometric probes are frequently of complex design, resulting in increased manufacturing costs. It is, therefore, desirable to provide an autonomous simple low-cost solution where the above difficulties are alleviated. A need remains for a low-cost miniaturized spectrometric sensor/transducer with a spectral resolution comparable to that of conventional spectrometer, and capable of determining the absorbance spectral signature of a wide variety of substances in situ.

It would be advantageous to provide a small, hand-held, portable spectrometer having sufficient resolution and accuracy for use in applications where the spectrometer is installed as a sensor in a monitoring system.

OBJECT OF THE INVENTION

It is an object of this invention to provide a method for spectrum resolution enhancement.

It is an object of this invention to provide a method for use with an integrated spectrometric sensor/transducer permitting miniaturization of spectrophotometers while maintaining a sufficient amount of resolution.

It is an object of this invention to provide a method of estimating a corrected spectrum the corrected spectrum corrected for imperfections in a spectral imaging apparatus.

SUMMARY OF THE INVENTION

The resolution limitations imposed by physical size of a spectrometer are well understood. These limitations are circumvented with the use of sophisticated technologies for implementing a method of resolution enhancement for use with a low resolution grating. These methods allow for design and manufacture of portable instruments.

In accordance with the invention, a new method for providing an integrated spectrometric sensor/transducer (IISS/T) is proposed enabling in situ light-spectrum-based measurement, at a significantly reduced cost. The new method is effective. Correspondingly, IISS/T allows the manufacture of a plurality of embodiments of miniature spectrometric probes and hand-held spectrometers adapted to the different needs. For example, some are provided with wireless communication for near continuous transmission of information using wireless, or other communication systems. This is useful, in particular, for real-time industrial and environmental monitoring.

The proposed new method of the light-spectrum measurement augments measurement accuracy using digital signal processing instead of the conventional approach of improved optics and reduced noise.

According to the invention, there is provided a method of measuring a spectrum of incident light comprising the steps of capturing a spectrum of the incident light at a first resolution; digitizing the analogue measurement to provide an electrical signal; and, processing the electrical signal in order to obtain a spectrum having a higher resolution than the captured spectrum, said spectrum being an estimate of the measured light-spectrum and/or its parameters. Preferably, the optical hardware of a designed spectrometer is minimized. Further preferably, the entire method is implemented in a small hand-held device.

The proposed method of extracting information from an optical signal is more efficient than sophisticated analog processing and free of troubles characteristic thereof. It has significant advantages over optical processing. For example, though spectrometers have seen few significant advances in past several decades, digital processors are experiencing significant performance gains. With enhanced performance, more complicated and sophisticated methods may be implemented. This allows for improved performance during the upcoming years and/or further miniaturization. Further, today's semiconductor-based integration technologies allow for VLSI implementation of digital processors and optical components. Moreover, an increase in accuracy of electrical digital signal processing does not necessarily imply an increase in technological difficulties of its implementation, which is typical of optical analog signal processing.

Advantageously, the IISS/T uses low cost, low-resolution optical components. By using low-resolution optical components in the form of gratings, overall size of the device is significantly reduced. However, absent significant enhancement of spectral resolution, spectra determined using low-resolution optical components are unacceptable for many applications.

Preferably, the IISS/T comprises processing components that are functionally fused.

Preferably, a specialized digital signal processor for execution of specialized methods of spectrum reconstruction and/or of spectrum parameter estimation ensures a required quality of results.

In accordance with an embodiment of the invention, there is provided a spectrometer comprising: a transducer comprising a dipersive element for dispersing light and a photodetector for converting the dispersed light into an electrical signal representative of spectral data, the transducer having a lower spectral resolution than 4 nm; and, a processor for enhancing the resolution of the spectral data to provide spectral data having a resolution of at least 2 times that of the transducer.

Preferably, the spectrometer is provided with means of measuring temperature and of correcting spectra for temperature fluctuation induced errors.

In accordance with an embodiment of the invention, there is provided a spectrometer comprising:

a low resolution transducer comprising a dipersive element for dispersing light and a photodetector for converting the dispersed light into an electrical signal representative of spectral data; and, a processor for significantly enhancing the resolution of the spectral data using stored data, the stored data relating a captured spectrum of a sample to a known spectrum of the sample having higher resolution.

In accordance with an embodiment of the invention, there is provided a spectrometric sensor comprising:

a low resolution transducer consisting of a port for receiving electromagnetic radiation for measuring a spectrum thereof; a dipersive element for receiving the electromagnetic radiation received at the port, for dispersing the received electromagnetic radiation, and for providing the dispersed electromagnetic radiation; a photodetector for receiving the dispersed electromagnetic radiation from the dispersive element and for converting the dispersed electromagnetic radiation into an electrical signal representative of spectral data;

an analog to digital converter for converting the electrical signal representative of spectral data into a digital electrical signal representative of spectral data; and, a processor for significantly enhancing the resolution of the spectral data and for correcting some errors within the spectral data using stored data, the stored data relating a captured spectrum of a sample to a known spectrum of the sample having higher resolution.

According to another aspect of the invention, there is provided a method of spectral measurement comprising the steps of:

imaging a first spectrum of a sample using a spectral transducer;

comparing the first spectrum to data representative of a known spectrum for the same sample;

determining calibration data for transforming the first spectrum into an approximation of the known spectrum;

imaging a spectrum of a second sample using the low-resolution spectral transducer;

estimating an ideal spectrum for the second sample using the calibration data, the estimation performed using the determined transformation.

Preferably estimation of the ideal spectrum results in a t least one of a spectrum with enhanced resolution and a spectrum corrected for imperfections in the spectral transducer.

In an embodiment, the first spectrum is defined by $\{\tilde{y}_n^{cal}\}$, the known spectrum is defined by $x^{cal}(\lambda)$, and wherein the calibration data is determined by the steps of:

choosing a form of an ideal peak $v_s(\lambda,l)$ and of projection operator G and reconstruction operator R;

pre-processing the data $\{\tilde{y}_n^{cal}\}$;

determining parameters $p_G$ of projection operator G and parameters $p_R$ of reconstruction operator R; and, storing calibration data comprising the determined parameters in memory.

According to another embodiment of the invention, there is provided a method of spectral measurement comprising the steps of:

calibrating of a spectrometer comprising a spectrometric transducer, the calibration for determining data relating to the spectrometric transducer;

imaging a spectrum of a sample; and, reconstructing a spectrum $s(\lambda;l,a)$ based on the determined data and related to the imaged spectrum, the reconstructed spectrum having a higher-resolution than the imaged spectrum.

BRIEF DESCRIPTION OF THE DRAWINGS

Exemplary embodiment of the invention will now be described in conjunction with the drawings in which:

FIG. 2a presents the flow diagram of functioning of the light-spectrum measuring instrument of an existing spectrometer;

FIG. 2b presents the flow diagram of functioning of the light-spectrum measuring instrument based on the inventive method using IISS/T;

FIG. 18 is a simplified block diagram of a method according to the invention; and, FIG. 19 is a simplified block diagram of another method according to the invention.

DETAILED DESCRIPTION OF THE INVENTION

Figure 1:
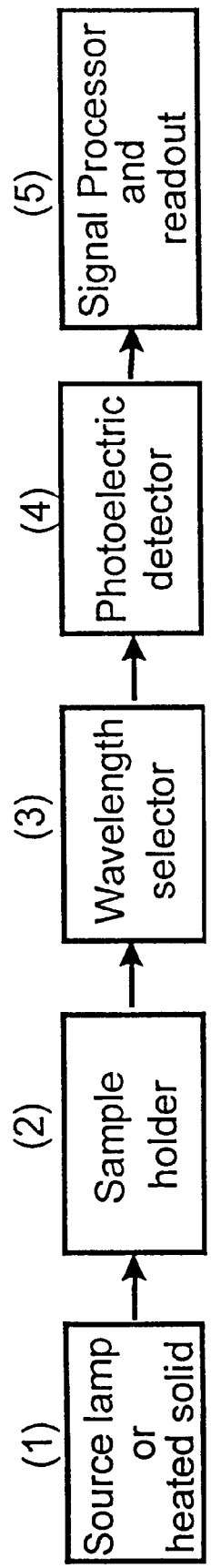
FIG. 1 presents a general functional block diagram of a spectrometer.

The following notation is used for the description of the invention:

$\lambda$—wavelength; $\lambda \in [\lambda_{min}, \lambda_{max}]$;

N—number of data acquired by the spectrometric apparatus;

$\Delta\lambda$—step of wavelength discretization; $\Delta\lambda = (\lambda_{max} - \lambda_{min})/(N-1)$;

$\lambda_n$—n-th datum acquired by the spectrometric apparatus; $\lambda_n = \lambda_{min} + (n-1)\Delta\lambda$ for $n = 1, \ldots, N$;

$x(\lambda)$—real spectrum of a sample under study;

l—vector of the positions of peaks the spectrum $x(\lambda)$ is composed of; $l = [l_1\ l_2\ \ldots\ l_K]^T$;

$\hat{l}$—an estimate of l;

a—vector of magnitudes of peaks the spectrum $x(\lambda)$ is composed of; $a = [a_1\ a_2\ \ldots\ a_K]^T$;

$\hat{a}$—an estimate of a;

$s(\lambda;l,a)$—an idealized spectrum of a sample under study, assumed to have the form:

$$s(\lambda; l, a) = \sum_{k=1}^{K} a_k v_s(\lambda, l_k)$$

where $v_s(\lambda,l)$ is an isolated, normalized peak in $s(\lambda;l,a)$, whose maximum is located at $$\lambda = l; \int_{-\infty}^{+\infty} v_s(\lambda, l) d\lambda = 1 \text{ for } l \in [\lambda_{min}, \lambda_{max}];$$

$\{\tilde{y}_n\}$—spectrometric data representative of $x(\lambda)$, acquired by means of the spectrometric apparatus; $\{\tilde{y}_n\} \equiv \{\tilde{y}_n | n = 1, \ldots, N\}$;

$x^{cal}(\lambda)$—real spectrum of a sample used for calibration of the spectrometric apparatus;

$s(\lambda; l^{cal}, a^{cal})$—an idealized spectrum of the sample used for calibration of the spectrometric apparatus;

$\{\tilde{y}_n^{cal}\}$—spectrometric data, representative of $x^{cal}(\lambda)$ used for calibration of the spectrometric apparatus; $\{\tilde{y}_n^{cal}\} \equiv \{\tilde{y}_n^{cal} | n = 1, \ldots, N^{cal}\}$;

G—an operator (algorithm) of projection mapping the idealized spectrum $s(\lambda;l,a)$ into the space of the data:

$$\{\tilde{y}_n\} = G[s(\lambda;l,a);p_G]$$

where $p_G$ is a vector or matrix of the parameters of the operator G, to be determined during calibration of the spectrometric apparatus; $p_G = [p_{G,1} p_{G,2} \ldots]^T$ or:

$$p_G = \begin{bmatrix} p_{G,1,1} & p_{G,1,2} & \cdots \\ p_{G,2,1} & p_{G,2,2} & \cdots \\ \vdots & \vdots & \ddots \end{bmatrix}$$

R—an operator of reconstruction such as a generalized deconvolution operator for transforming the data $\{\tilde{y}_n\}$ into an estimate $\hat{s}(\lambda)$ of $s(\lambda;l,a)$:

$$\hat{s}(\lambda) = R[\{\tilde{y}_n\}; p_R]$$

where $p_R = [p_{R,1} p_{R,2} \ldots]^T$ are parameters of the operator R including regularization parameters, the parameters determined during calibration of the spectrometric apparatus.

As mentioned above, increases in metrological performance of spectrometric instrumentation are based on improvements to optical hardware. Limitations on the size and quality of optical hardware implementations have resulted in large and expensive spectrometer systems, which are generally not well suited to installation and use in a single in situ test environment. Described herein is a spectrometer using lower resolution optical hardware which then augments resolution of the system using digital signal processing. The solution proposed herein is elegant and significantly advantageous. The method described herein permits implementation of an integrated broadband spectrometer. Further, the invention is significant in altering the approach to enhancing spectral resolution and thereby obviating many known obstacles in the design and implementation of spectrometers for in situ applications.

One of the limitations on the size of a spectrometer is the amount of light incident thereon. Since a typical spectrometer divides incident light into spectral bands of a finite resolution, the light is thereby divided and its intensity is thereby effected. For example, when incident light is divided into 100 spectral bands, the resulting bands each receive at most $1/100^{th}$ of the incident light. These bands may each represent 1 nm of spectral bandwidth—for a total bandwidth of 100 nm, 0.1 nm—for a total bandwidth of 10 nm, or 10 nm for a total bandwidth of 1000 nm. Unfortunately, the larger the band, the less value the spectral information has when reviewed since a broad range of wavelengths are included within a single band. For example, in medicat spectrometry, spectral bands of 0.1 nm or less are preferred since small differences in spectra are significant. Conversely, the smaller the band, the less light reaching a detector within the spectrometer. To overcome this is a simple matter. For example, in order to increase the light within a spectral band 100 fold, one need only increase the size of the detector area by 100. In essence, a larger size sensor permits higher resolution imaging of spectral data.

Referring to FIG. 2a, a simplified flow diagram of an existing spectrometer system is shown. Measurement accuracy depends on the performance of the optical analog signal processing. Conversion of the physical nature of the signal from the optical domain to the electrical domain is performed for display and communication purposes.

The block diagram, shown in FIG. 2b, corresponds to a spectrometer designed according to the proposed method of spectrum measurement of the invention. Accuracy of measurement significantly depends on performance of digital signal processing. According to the invention, optical hardware of a sensor/transducer is minimized, the optical information is converted into data in an electronic form using a detector and an analogue to digital converter, and then the data is processed using digital signal processing. In order to obtain a final measurement result, an estimate of the measured light-spectrum or parameters of the spectrum as defined by a user is performed. For example, using a digital signal processor with suitable programming, the spectrometer is calibrated. The calibration data relate to characterisitics of the optical spectral imaging of the device. For example, errors and imperfections of the transducer and transforms for correction thereof and relating to low optical resolution are determined. During use, once a spectrum is imaged and digitised, the information on the metrological imperfections of the optical component(s) is used to correct the digitised spectral data by, for example, adapting the parameters of the processing to the signal representing a measured light-spectrum after correction of the metrological imperfections of the optical component. The processor then determines an estimation of a measured light-spectrum or its parameters as defined by the user.

Figure 3:
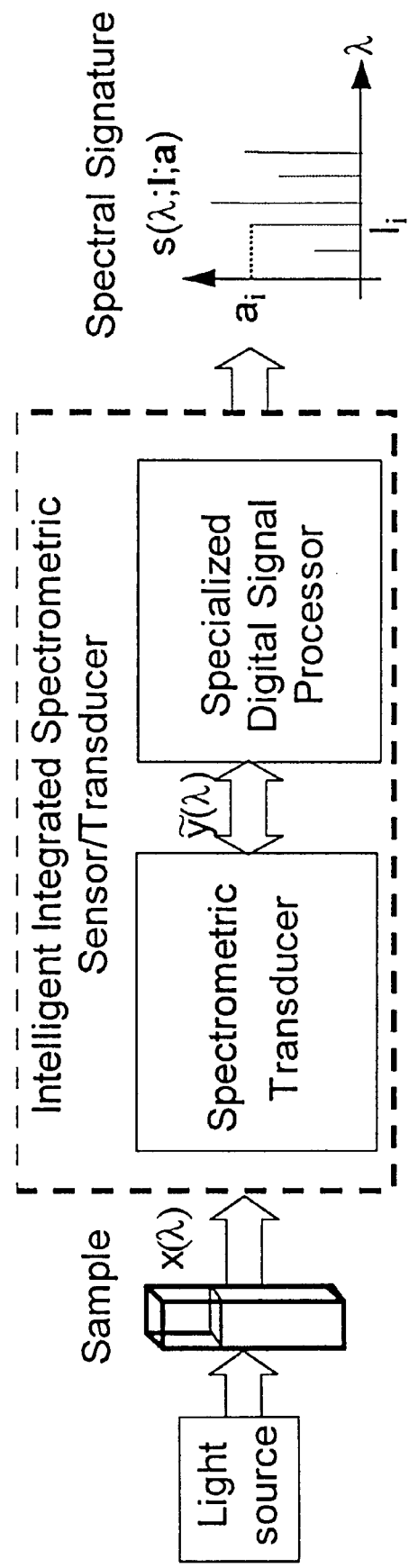
FIG. 3 is the illustration of the measurement principle underlying the proposed intelligent spectrometric transducer/sensor (IISS/T), according to the invention.

Referring to FIG. 3, measurement principles underlying the corresponding sensor/transducer according to the invention are illustrated. In this figure, <<sample>> is a sample of a substance whose spectrum is being measured, $x(\lambda)$ is a result of measurement of the spectrum obtained using a high-resolution optical spectrometer;

$y(\lambda)$ is a result of measurement of the spectrum obtained using a low-resolution optical spectrometer—thereby permitting miniaturization—for use in a hand-held device; and, $s(\lambda;l,a)$ is the measurement result from a device according to the present invention once $y(\lambda)$ is corrected and its resolution enhanced using a digital signal processor. In the figure, $s(\lambda;l,a)$ is a spectral signature, a set of characteristic peak positions and magnitudes of the sample under study. Alternatively, the measurement result is a reconstructed spectrum having a same spectral signature.

The light transformed by the sample under study is transporting measurement information whose extraction, in the proposed sensor/transducer, is herein described in two steps.

First, a low-resolution spectrometric transducer performs dispersion of light, by means, for example, of a simple dispersing element. Photodetectors are used to convert the dispersed light into voltage. An A/D converter (analog-to-digital converter) is used to convert this voltage into a digital signal. This step essentially provides for creation of the spectrum by illuminating a sample, dispersing the resulting spectrum, and capturing the dispersed spectrum to provide an electronic data signal for use in the second step.

In the second step, a digital signal processor executes methods of spectrum reconstruction and enhancement of resolution on the digital data signal in order to estimate the actual spectrum with the desired accuracy and precision. Preferably, the digital signal processor is a specialised processor for use in this step. The term augmentation of spectral data is used herein to refer to the operations performed according to the present method for enhancing spectral resolution and for correcting errors of the spectral imaging transducer.

The specialized digital signal processor of the IISS/T is provided, during a calibration process, with information on the metrological imperfections of the spectrometric transducer's optical components. In essence, samples with known spectra are analyzed and calibration data relating to the electronic data and how it differs from known spectra for those samples is determined. This calibration data may include a selection of appropriate spectral enhancement methods that best suit the device or the type of spectrum, errors in spectral imaging such as attenuation curves, and other calibration information. The calibration data is used for spectrum reconstruction and/or for producing the final measurement result: the estimate of the spectrum or its parameters.

The IISS/T according to the invention comprises a dispersive element, a photodetector, an A/D converter, and a digital signal processor (DSP). The dispersive element and the photodetector co-operate to form a spectrum having a resolution lower than a desired output resolution. The DSP is used to augment the spectrum to produce an output spectrum or output data having sufficient resolution. Because much of the processing is performed within the DSP, the cost of the DSP is a significant portion of the overall sensor cost. With current trends in semiconductor design and manufacture, it is anticipated that the sensor cost will be reduced in the future as DSP processors having sufficient processing power become more affordable.

Preferably, the IISS/T comprises a DSP and a miniature, low-cost and low-quality spectrometric transducer comprising, for example simple dispersive elements, photodetectors, and an analog-to-digital converter. This fusion of the functional blocks enables a designer of IISS/T to profit from advantages of each of the optical and electrical portions. In fact, reprogramming of the IISS/T is possible and software, modifications that improve the overall performance are anticipated. It is well known that software distribution and upgrading is inexpensive relative to the costs associated with similar hardware upgrades. Further, the use of an integrated opto-electrical device provides excellent opportunity for automatic correction of temperature induced errors. A small temperature sensor circuit is disposed at each of a plurality of locations within the integrated device. The temperatures are determined and appropriate correction of an imaged spectrum is performed depending on the temperature of the optical components. Of course, the DSP is not susceptible to errors induced by temperature fluctuations so long as it operates within a suitable temperature range. Therefore, a device according to the invention is provided with an effective low-cost system of compensating for temperature fluctuations.

Figure 4:
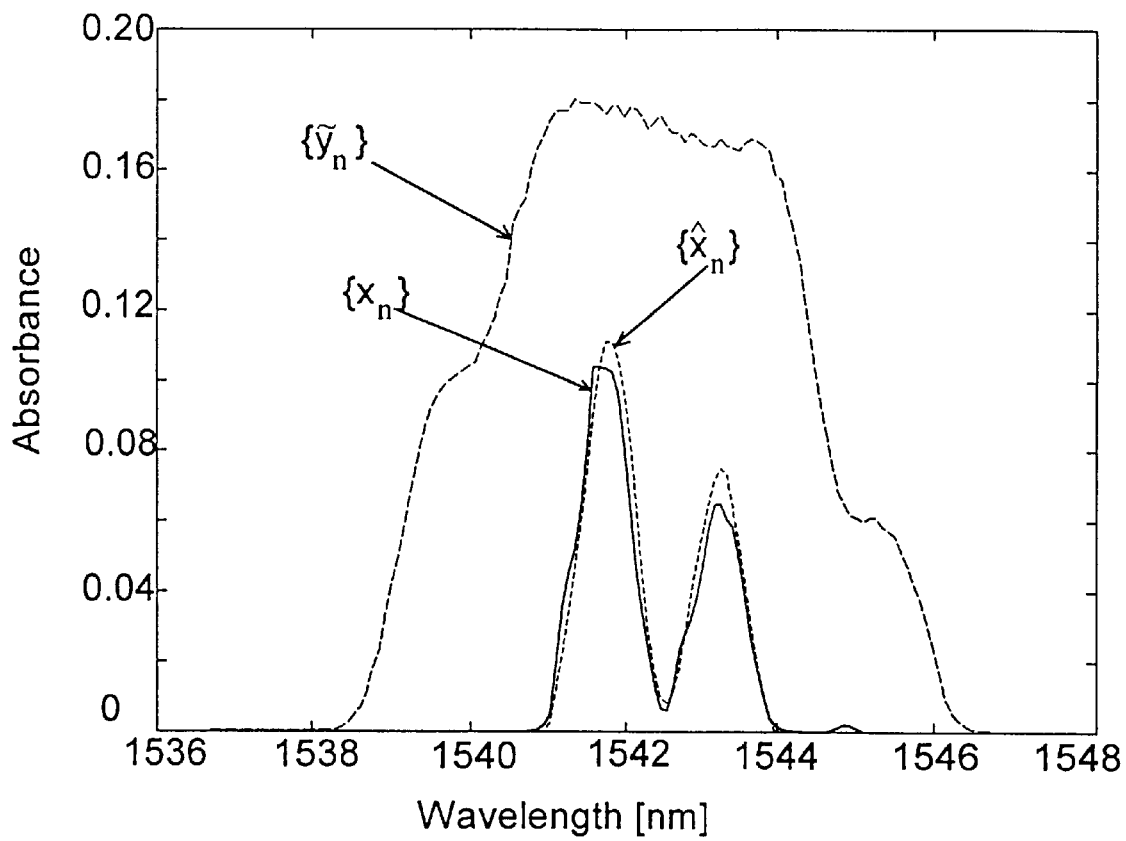
FIG. 4 is the illustration of practical gains implied by to the invention.

FIG. 4 illustrates the results of an experiment showing the practical gain in the quality of the measurement result obtained using the invention. In this figure $x(\lambda)$ represents data acquired by means of the reference spectrophotometer ANRITSU (MV02-Series Optical Spectrum Analyzer) set to the resolution of 0.1 nm (which is not available in today's integrated spectrometers);

$y(\lambda)$ is a raw measurement acquired by means of a same reference instrument set to a resolution of 5 nm—a typical resolution of integrated spectrometers without internal specialized digital signal processors; and, $\hat{x}(\lambda)$ is an estimate of a spectrum, whose resolution is 0.1 nm, obtained using digital signal processing according to the invention.

As is evident from a review of FIG. 4, a low resolution $y(\lambda)$ is enhanced to form an excellent approximation of the spectrum measured using a higher resolution spectrometer.

Comparison of the signals $x(\lambda)$, $y(\lambda)$ and $\hat{x}(\lambda)$ gives an idea of practical gains obtained using the invention—the gain in resolution shown is of the order of 10. Therefore, the experiment clearly demonstrates that using a low-resolution dispersive element and a DSP, results are typical of a spectrometer having significantly better resolution. Since size of spectrometers is at least partially related to resolution, a device according to the present invention permits spectrometers of significantly reduced size for use in similar applications. Of course, the reduced size and cost of the device permit many new applications heretofore prohibited by size, cost, and/or resolution of prior art spectrometers.

The proposed method of extracting information from the optical signal is, in some ways, more efficient than sophisticated optical analog processing. Further, it is free of some troubles characteristic for this type of processing. As described below, it appears more complicated conceptually because of the use of sophisticated algorithms for digital signal processing. The proposed method permits modifications and selection of different processing methods without altering a physical sensor device. Heretofore, improvements to a spectral sensor required replacement or hardware modification of the sensor. Technologically, the present invention is adaptable and simple because, taking into account today's semiconductor-based integration technologies, VLSI implementation of the algorithms is easier than miniaturized integration of optical functions. Moreover, the increase in accuracy of electrical digital signal processing does not necessarily imply an increase in technological difficulties of its implementation, as is typical of optical analog signal processing.

Figure 5:
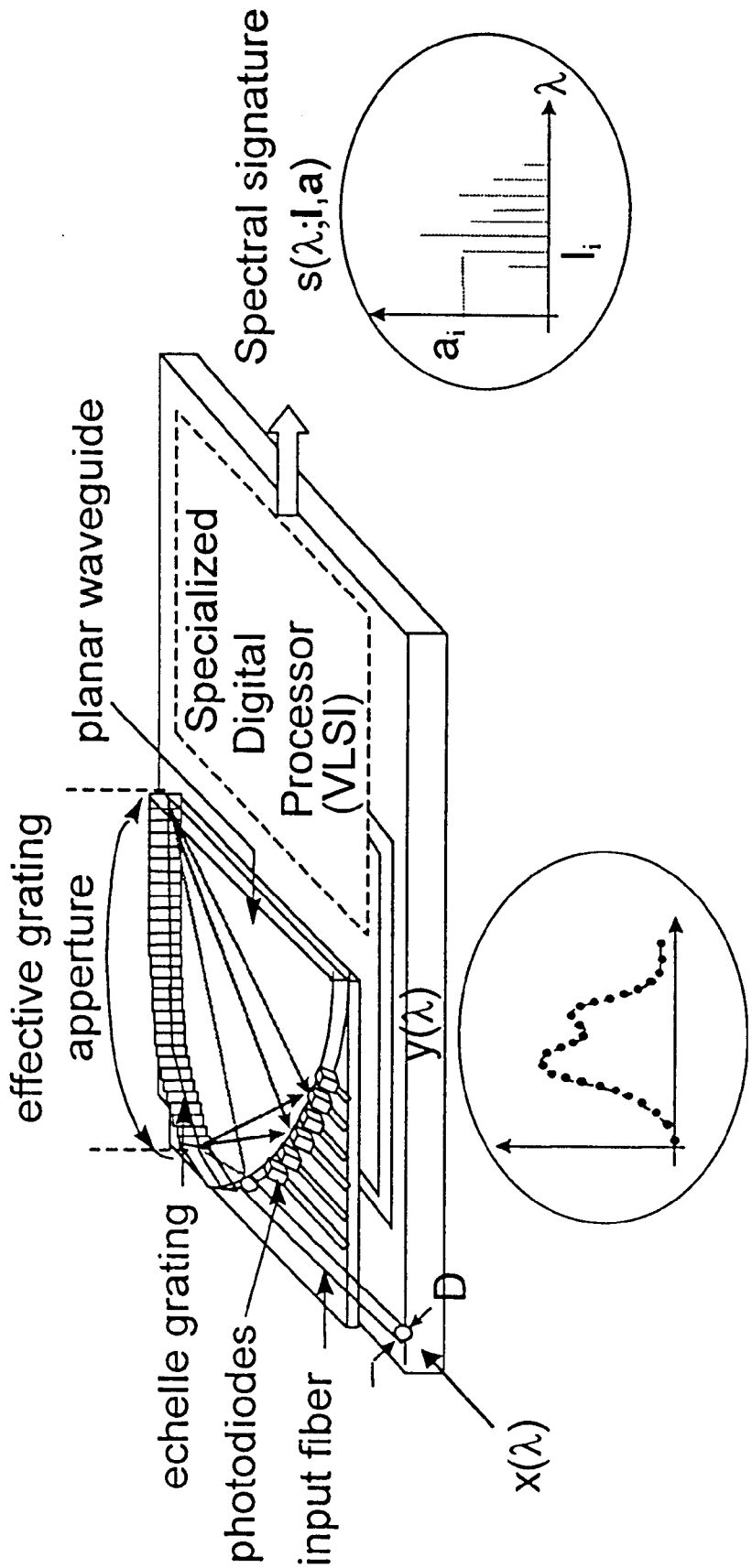
FIG. 5 presents the foreseen generic structure of the IISS/T.

An exemplary structure of the IISS/T is shown in FIG. 5. The miniature, possibly low-cost, spectrometric transducer, shown in this figure includes a diffractive grating 5 and photodetectors 10 in the form of a CCD. Optionally, using semiconductor-based integration technologies such as CMOS technology, such a device is manufactured as an integrated device.

Light from a sample and representing a spectrum requiring analysis is received at port D. The light is characterized by the $x(\lambda)$. The light is provided to dispersive element 5 through which it is dispersed to photodetectors 10 which provide an electronic signal corresponding to a captured spectrum, $\overline{y}(\lambda)$. Since the dispersive element 5 is of small size (shown within a single integrated circuit), resulting resolution of the captured spectrum is low. The electronic signal is provided to a processor 20, in the form of a specialized DSP, where it is digitized and augmented to form an output spectrum or output spectral parameters.

Depending on a targeted wavelength range of the IISS/T, the optical portion of the IISS/T, shown in FIG. 5, is implemented in a same silicon integrated circuit (IC) as the digital processor or, alternatively, in a separate IC. Alternatively, it is mounted on an IC as an external element manufactured separately for technological reasons. Further alternatively, it is mounted separate from the IC and optically aligned therewith.

As mentioned above, the miniaturization of spectrometric instruments is limited by the required accuracy of measurement and limitations of integrated devices. Implementation of optical functions using semiconductor-based integration technologies does not provide similar performance to classical discrete optical instrumentation. This is an important motivation for the invention, which allows for miniaturization of spectrum-measurement-based instrumentation.

As a further example, let us assume that a spectrometric transducer used in an IISS/T is characterized by the following parameters:
range of wavelength from 450 to 650 nm (Vis),
total surface of the spectrometric transducer: 1 cm$^2$,
Litrow configuration of a diffractive grating
photodetector composed of semiconductor diodes whose diameter is 25 $\mu$m;
then using the developed model of the spectrometric transducer of the IISS/T, we obtain the following:
a diffractive grating with 1200 steps/mm,
a number of diodes: 160, with total width of the detector of 4 mm
optical resolution of obtained optical transducer $\Delta\lambda$=11 nm.
Unfortunately, these results follow from the above assumptions so a higher resolution detector requires either different assumptions or processing of the obtained—imaged— spectra according to the invention.

Figure 6:
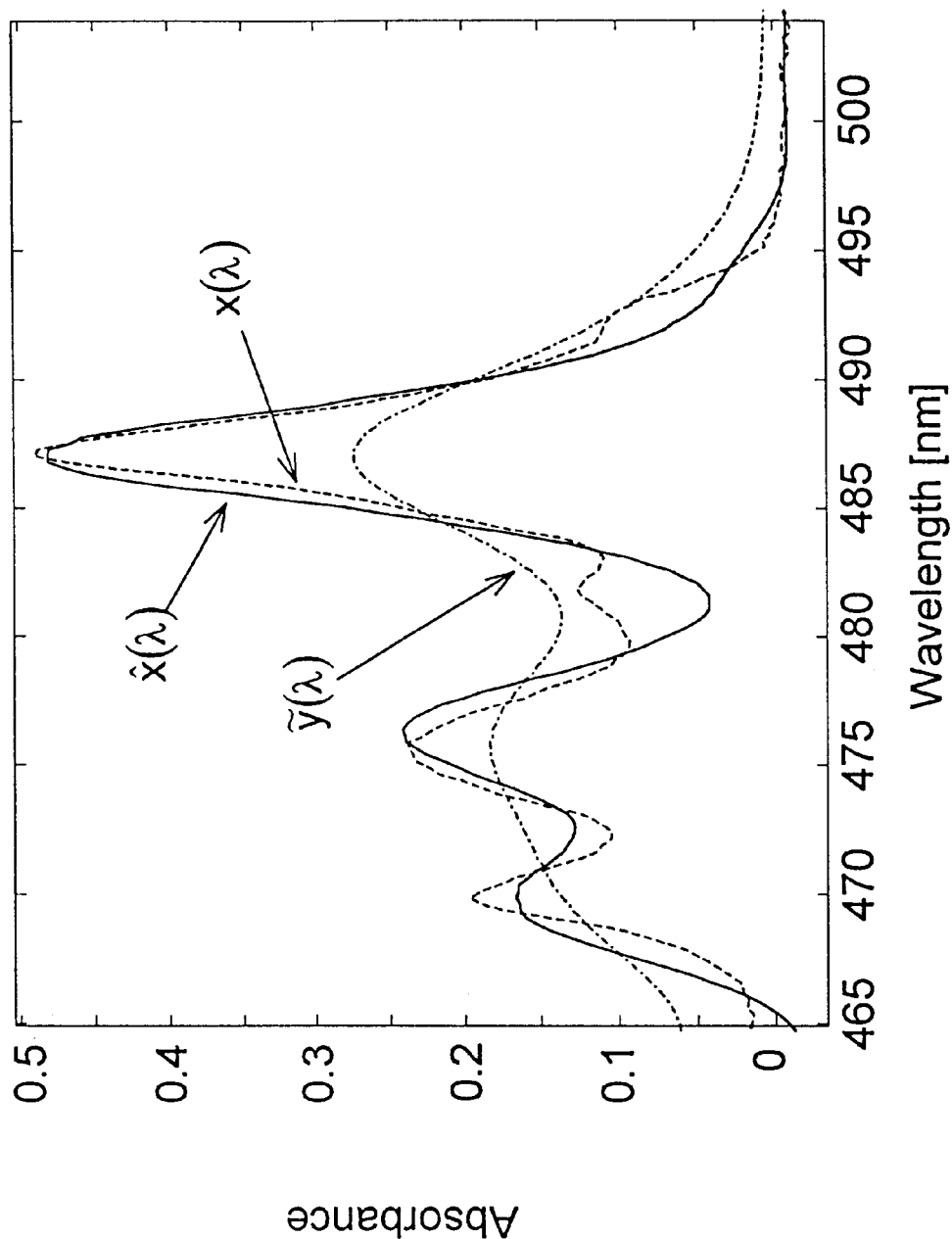
FIG. 6 is the illustration the effectiveness of the correction of the imperfections of the spectrometric transducer, by means of the specialized digital signal processor.

FIG. 6 illustrates the results of an experiment showing the effectiveness of the IISS/T designed according to the invention. In this figure:

$x(\lambda)$ represents the data acquired by means of a reference spectrometer CARY-3 (Varian) set to a resolution of 0.2 nm—a resolution not commonly available in prior art integrated spectrometers;

$\overline{y}(\lambda)$ is a measurement result at the output of the model of the spectrometric transducer of the IISS/T, with 15 nm resolution; and, $\hat{x}(\lambda)$ is an estimate of the spectrum $x(\lambda)$, whose resolution obtained after digital signal processing is approximately 0.1 nm. This is the resolution obtainable at the output of the IISS/T, proposed according to the invention, satisfying the users'requirements for many practical applications. An enhancement of about 10 times the resolution is achieved. Of course, as spectral enhancement increases to for example 40 or 60 times the resolution of the transducer, it is expected that errors in estimation will also increase. This should be evaluated on an application by application basis to determine applicability and degree of miniaturization of the invention for a particular application.

Figure 7:
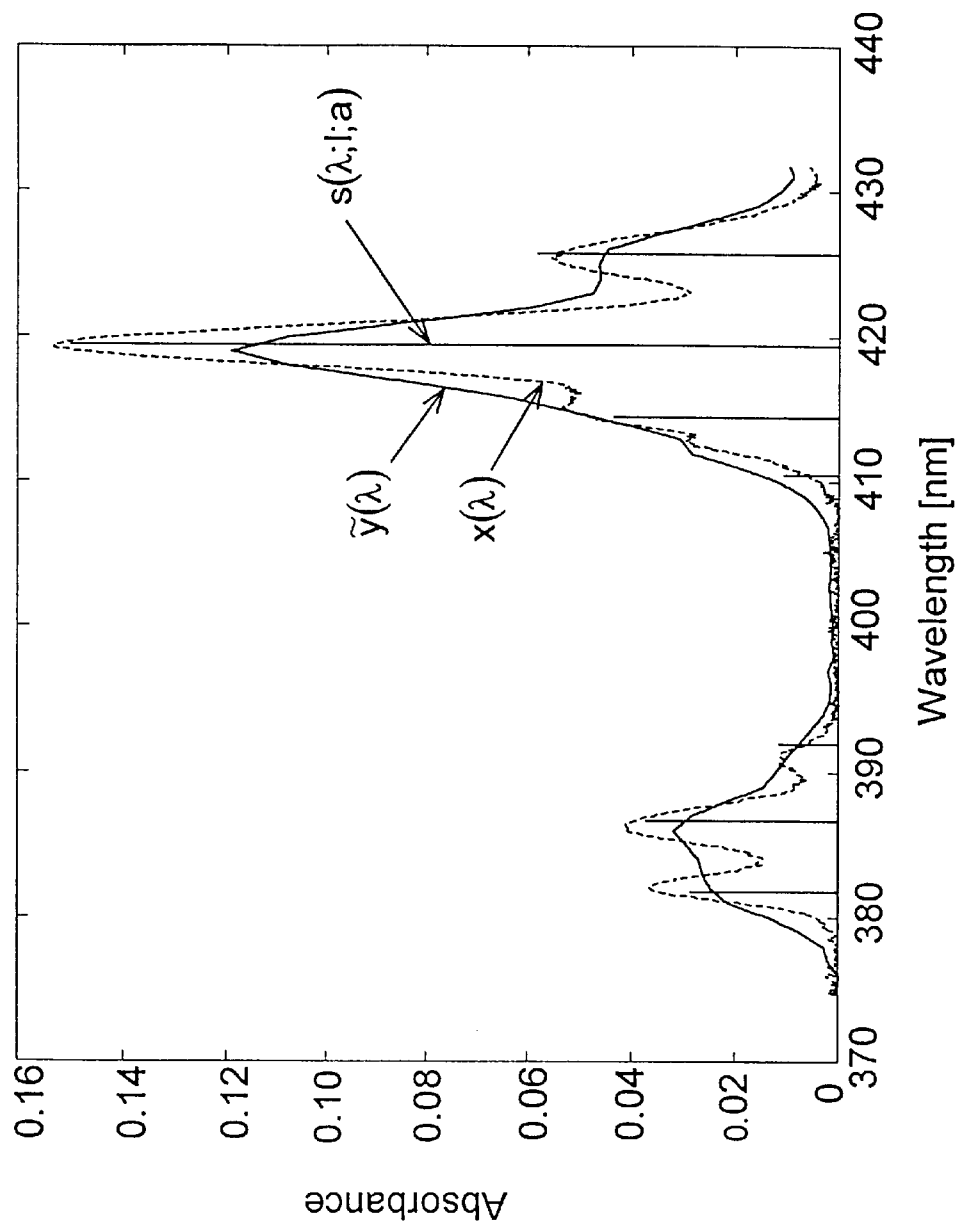
FIG. 7 illustrates the results of the consecutive stages of signal processing performed by the model of the IISS/T, according to the invention.

Referring to FIG. 7, signal-processing methods performed in the IISS/T and according to the invention are illustrated. In this figure:

$x(\lambda)$ represents data obtained by a reference spectrometer CARY-3 (Varian) set to the resolution of 0.2 nm which is not commonly available in today's integrated spectrometers;

$\overline{y}(\lambda)$ is a measurement result obtained by means of a same instrument set to a resolution of 4 nm since a resolution of the order of 1–10 nm is considered obtainable from integrated spectrometers having no spectral augmentation depending on technology used for implementing optical signal processing functions; and, $s(\lambda;l,a)$ is the spectral signature of $x(\lambda)$, obtained after digital signal processing and, therefore, obtainable at an output of the IISS/T proposed according to the invention. This represents an increase in resolution of 40 times. As is seen in the diagram, the error in the estimation is quite pronounced. For some applications, this will be sufficiently accurate, for other applications, a larger transducer having a higher resolution is used.

In this example, the processing performed by the DSP includes computing of the parameters of the analyzed light-spectrum—the positions and magnitudes of peaks the spectrum is composed of. Some of those parameters correspond to specific light emission or specific pollutants contained in the analyzed sample.

Figure 8:
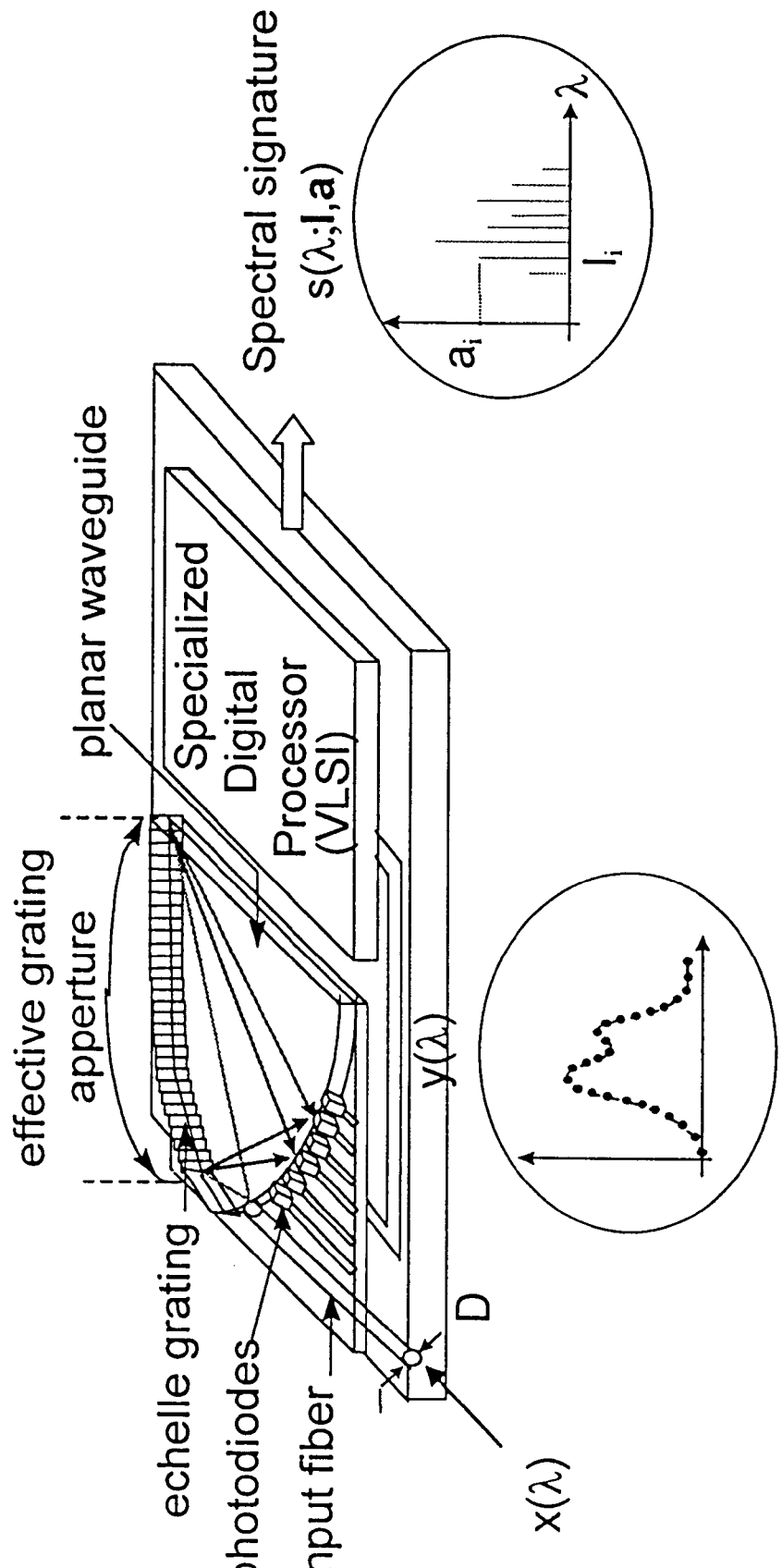
FIG. 8 presents the example of the hybrid, two-chip structure, of the IISS/T.

In FIG. 8, an example of a hybrid version of the IISS/T comprising two fused chips is shown. This embodiment employing separate integration of the spectrometric transducer and of the specialized dedicated digital electrical signal processor, is a natural step towards total integration. It is also useful for prototyping, flexibility in selecting a DSP, when combinations of the IISS/T with various input sensors for different spectrum-measurement-based applications is desired and so forth. Functionally, the device of FIG. 8 operates in accordance with the description relating to FIG. 5.

For monolithic implementation of a fully integrated IISS/ T, shown in FIG. 5, constraints include those imposed by the fact that microelectronics (VLSI) and integrated optics technologies are not yet completely technologically compatible; however, the monolithic implementation of some application-specific measuring systems was successful as described by R. E. Kunz in "Totally Integrated Optical Measuring Sensors", *SPIE Proceedings*, Vol. 1587, 1991, pp. 98–113, by L Templeton, I M; Fallahi, M; Erickson, L E; Chatenoud, F; Koteles, E S; Champion, H G; He, J J; Barber, Focused ion beam lithography of multiperiod gratings for a wavelength-division-multiplexed transmitter laser array, *RPU—Journal of Vacuum Science and Technology—Section B—Microelectronics Nanometer Structures*, 1995, v.13, n.6, p.2722, 3p. The research progress in the domain of multilayer silicon-based materials is very rapid and promises new possibilities for monolithic implementation of the IISS/T. The attainable parameters of the IISS/T justify the attempts to develop mass production of low-cost miniature spectrometric sensors/transducers.

Figure 9:
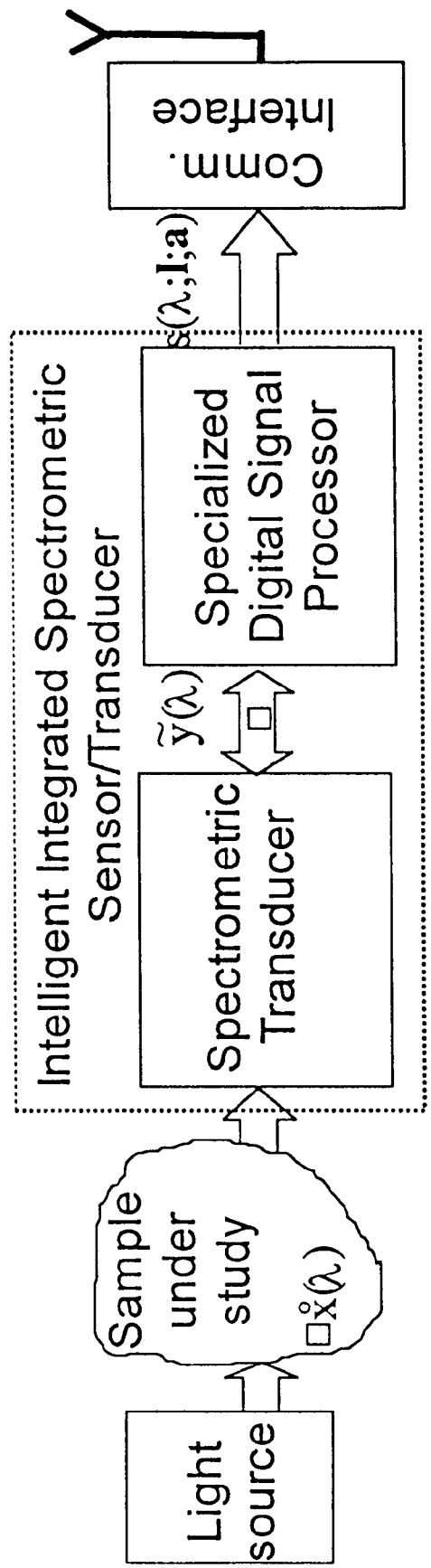
FIG. 9 is the illustration of the principle of functioning of an intelligent spectrometric probe using the proposed IISS/T.

FIG. 9 shows an exemplary application of an IISS/T according to the invention wherein the IISS/T is for use in a remotely controlled spectrometric probe for real-time environmental and/or industrial monitoring. The probe is mainly composed of the IISS/T, a light source selected for a specific application, and a telecommunication means for real-time communication with a monitoring network. In some applications, other sensors and transducers provide input light to the IISS/T. In this case the IISS/T is used as a transducer. Where measurement of a spectrum is desired, the IISS/T acts as a sensory input of the probe.

Once the data are captured, interpretation of the data is not a straightforward task. Before the data are interpreted, the spectral data requires augmentation. For example, when captured at a resolution of 10 nm, spectral data is not useful for most applications. In order to produce a hand-held broadband spectrometric sensor at a reasonable cost using current technology, a grating having a low resolution, such as 4 nm–10 nm, is employed. Therefore, it is essential that the captured spectrum is augmented prior to analysis. As proposed herein, the method of augmentation involves estimation of spectral values from the low-resolution spectrum based on existing calibration data of the sensor. The augmentation process is set out below.

Figure 10:
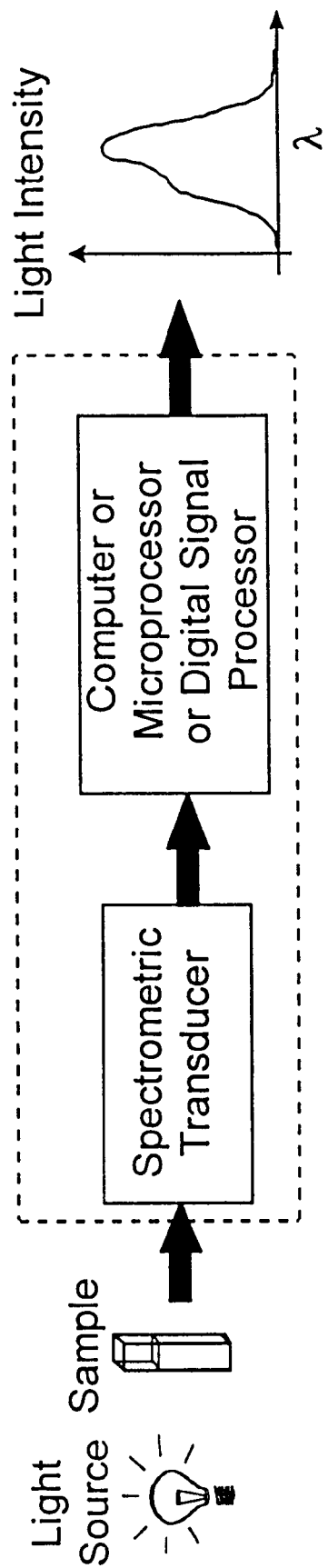
FIG. 10 is a simplified diagram of a spectrometric apparatus; a computing means in the form of a microprocessor, such as a digital signal processor.
Figure 11A:
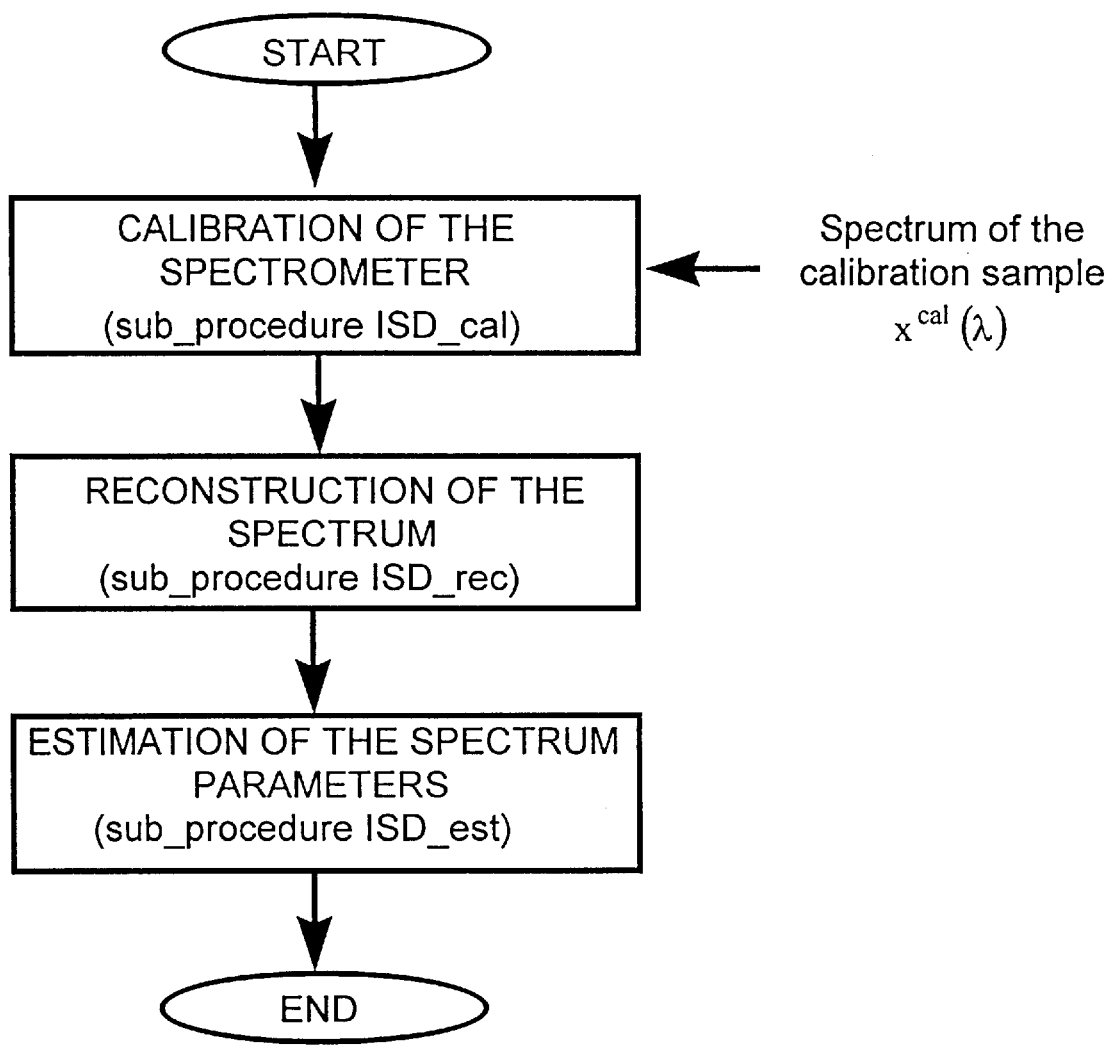
FIGS. 11a through 11d are simplified flow diagrams of each of 4 steps according to an exemplary embodiment of the invention.
Figure 11B:
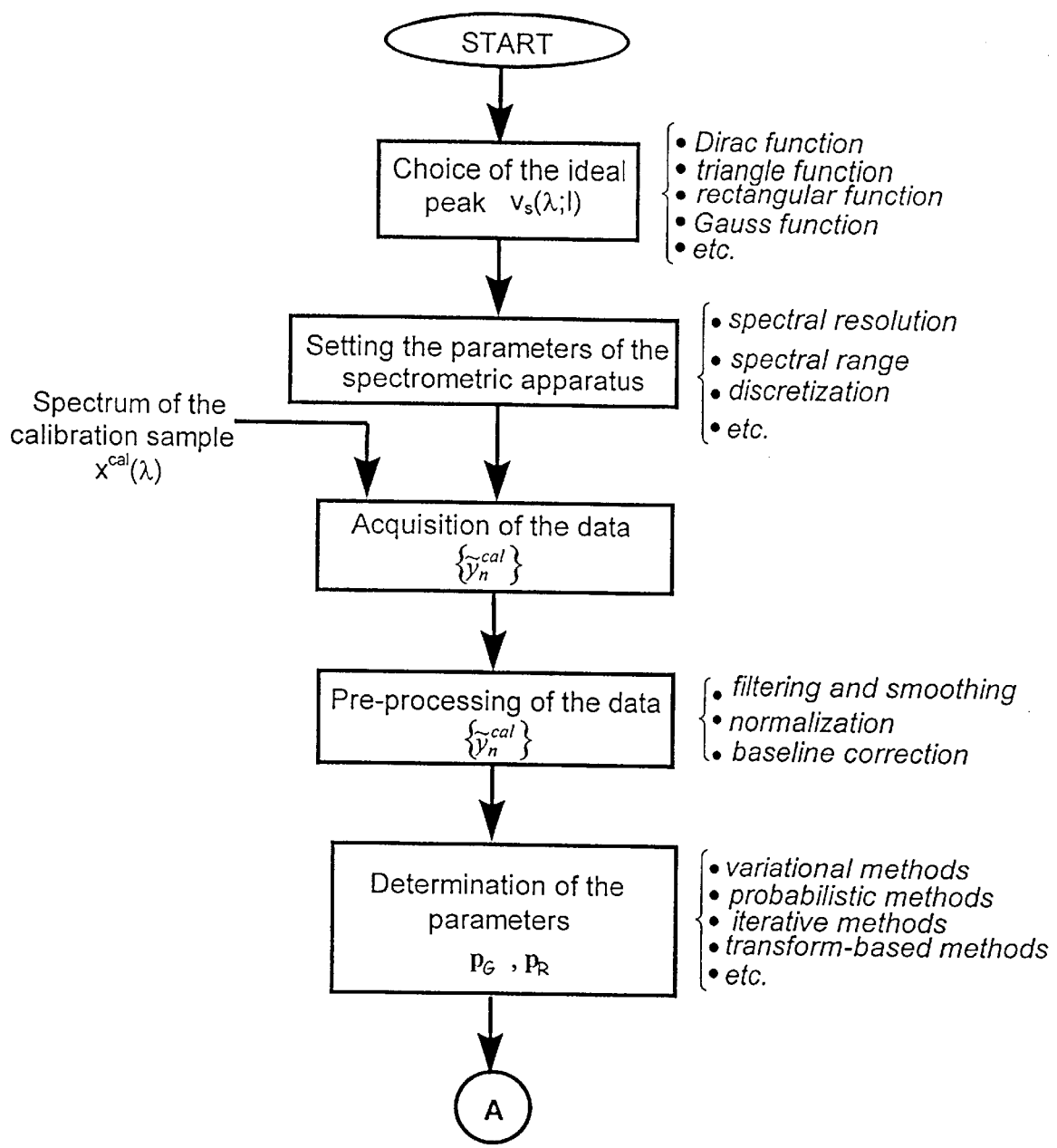
Figure 11C:
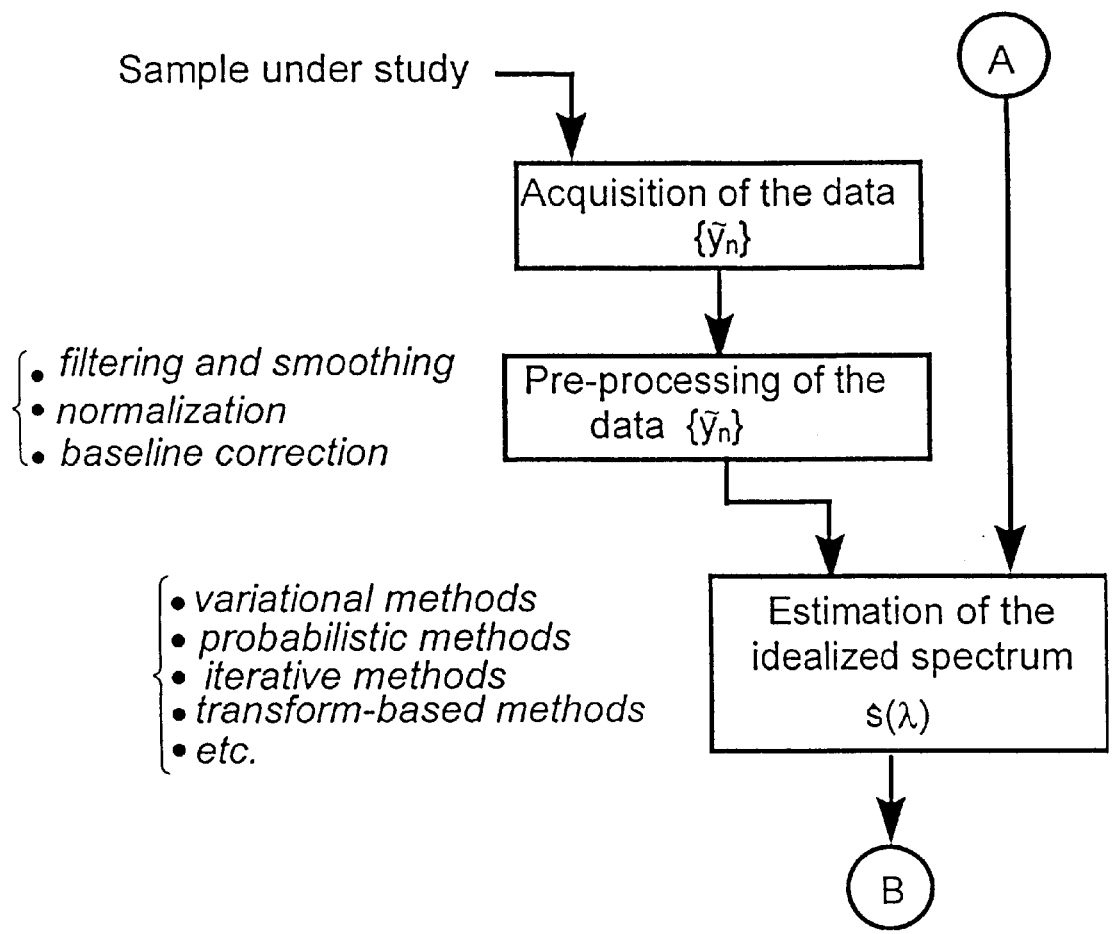
Figure 11D:
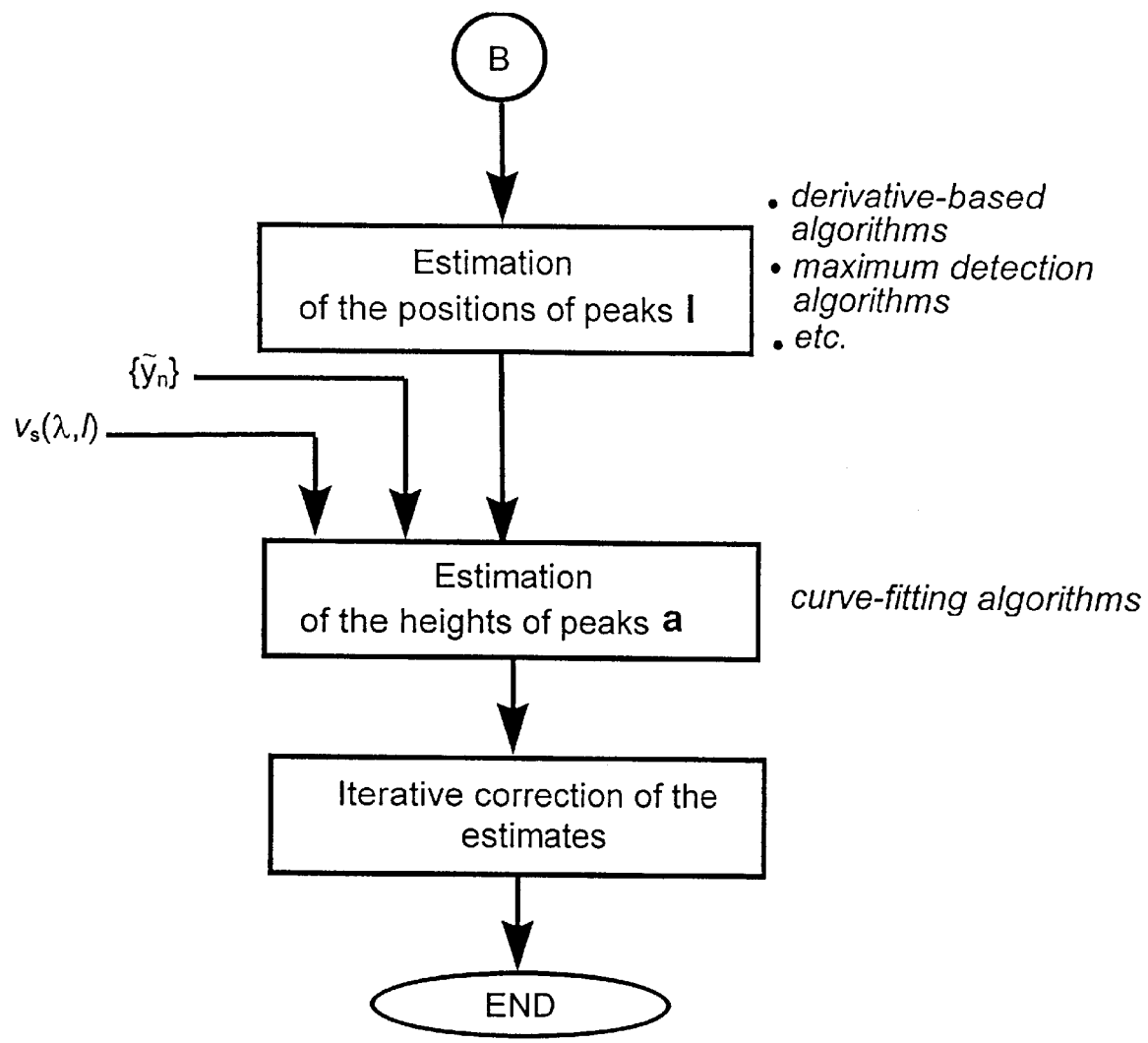

Referring to FIG. 10, a system is shown comprising the following; a spectrometric apparatus, in the form of a a spectrometric transducer for converting an analogue electromagnetic signal, such as light containing information of a measured spectrum, into a digital electrical signal representing the spectrum; a computing means in the form of a microprocessor, a general-purpose digital signal processor, or an application-specific digital signal processor; and, other functional elements necessary for measuring a spectrum of a sample of an analyzed substance (hereinafter referred to as sample).

The method of augmenting spectra set out below is useful in the IISS/T as a method implemented within the processor. It is described herein as an embodiment of a method of implementing spectral augmentation. Of course, the IISS/T may be provided with another suitable method as are known or may become known in the art. The method of augmenting spectra set out below is also for general application to other spectrometric devices.

The main objective of the method of enhancing resolution and correction of spectral data—augmenting spectra—is estimation of the positions l and magnitudes a of the peaks contained in the spectrum of a sample under study $x(\lambda)$ on the basis of the acquired spectrometric data $\{\tilde{y}_n\}$. The feasibility of this operation is critically conditioned by an auxiliary operation on the reference data $\{\tilde{y}_n^{cal}\}$ and corresponding reference spectrum $x^{cal}(\lambda)$, referred to as calibration of the spectrometric apparatus. This operation is aimed at the acquisition of information on a mathematical model of a relationship between spectrometric data and an idealized spectrum, which underlies the method according to the present embodiment for estimation of the parameters l and a. Although calibration does not necessarily directly precede augmentation of a sequence of spectrometric data $\{\tilde{y}_n\}$, valid calibration results should be available during this process.

A significant difficulty, related to estimation of positions l and magnitudes a of spectrometric peaks, relates to blurring of those peaks caused by physical phenomena in a sample and by blurring of their representations in the data $\{\tilde{y}_n\}$ caused by imperfections in spectrometric apparatus. This difficulty is overcome according to the present method through application of a process for reconstruction of an idealized spectrum $s(\lambda;l,a)$ in order to correct the spectrometric data by, for example, reducing blurring caused by both sources; if $s(\lambda;l,a)$ is assumed to be an approximation of $x(\lambda)$, then only the instrumental blurring is corrected.

In accordance with the above general functional requirements and referring to FIGS. 11a through 11d, the method comprises the following steps:

calibration of a spectrometer (the sub-procedure ISD_cal), reconstruction of a spectrum $s(\lambda;l,a)$ (the sub-procedure ISD_rec), estimation of parameters l and a on the basis of an estimate $\hat{s}(\lambda)$ of $s(\lambda;l,a)$ (the sub-procedure ISD_est).

Sub-procedure ISD_cal

The sub-procedure ISD_cal comprises the following steps:

a) choosing a form of ideal peak $v_s(\lambda,l)$ and of operators G and R;;

b) choosing a calibration sample whose spectrum $x^{cal}(\lambda)$ is known;

c) setting measurement parameters of the spectrometric apparatus;

d) acquiring data $\{\tilde{y}_n^{cal}\}$ representative of the calibration sample whose spectrum $x^{cal}(\lambda)$ is known;

e) pre-processing of the data $\{\tilde{y}_n^{cal}\}$ to eliminate outliers, to perform baseline correction, smoothing, acquiring a priori information in the form of a pre-estimate of the variance of errors in the calibration data, and normalization;

f) determining parameters $p_G$ of the projection operator G, and parameters $p_R$ of the reconstruction operator R. A process for performing these estimations is preferably tuned for use with a specific apparatus. For example, when known variance exists in a type of dispersive element, this a priori knowledge is beneficial in determining the process for performing estimations and thereby determining a process for calibration. Of course, this is not necessary since some processes for estimation and calibration are substantially universal for spectrometric apparatuses.

Sub-procedure ISD_rec

The sub-procedure ISD_rec comprises the following steps:

a) setting measurement parameters substantially the same as those above;

b) acquiring data $\{\tilde{y}_n\}$ representative of a sample under study;

c) pre-processing of the data $\{\tilde{y}_n\}$ in a similar fashion to the preprocessing for determining the calibration data;

d) estimating an idealized spectrum $s(\lambda;l,a)$ on the basis of the data $\{\tilde{y}_n\}$, by means of the predetermined operator R and the parameters $p_R$;

Sub-procedure ISD_est

The sub-procedure ISD_est comprises the following steps:

a) estimating positions l of peaks within a spectrum on the basis of the estimate $\hat{s}(\lambda)$ of $s(\lambda;l,a)$ by means of a maximum-detection algorithm;
b) estimating magnitudes a of the peaks, by means of a curve fitting algorithm using one of the following methods:
   the data $\{\tilde{y}_n\}$, $v_s(\lambda,l)$, the operator G with parameters $p_G$, and the estimate $\hat{l}$;
   the estimate $\hat{s}(\lambda)$, $v_s(\lambda,l)$ and the estimate $\hat{l}$.
c) iteratively correcting the estimates of the parameters of peaks obtained in (a) and (b);
d) adapting the results of parameter estimation in accordance with user requirements, such as transformation of parameters into some pre-defined parameters of an analyzed substance.

Figure 12:
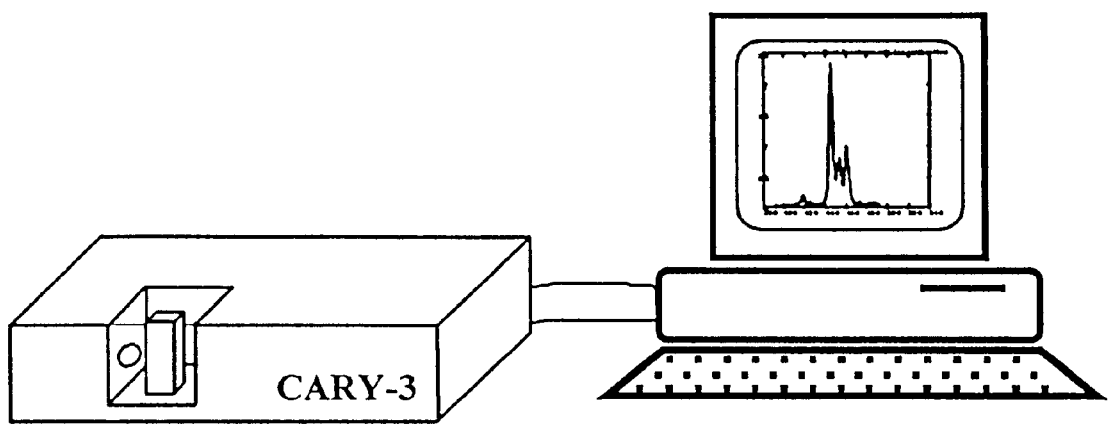
FIG. 12 is a simplified diagram of a measuring system according to the prior art comprising: an absorption spectrophotometer—model CARY-3 by VARIAN and a personal computer PC.

A particular implementation of an exemplary embodiment has been designed for a measuring system as shown in FIG. 12 comprising: an absorption spectrophotometer—model CARY-3 by VARIAN and a personal computer PC.

The following measurement parameters have been selected both for calibration and for acquisition of test data:

a wavelength range: $\lambda_{min}$=199.9 nm, $\lambda_{max}$=800 nm;
number of data acquired by the spectrophotometer: N=6002;
step of wavelength discretization: $\Delta\lambda = (\lambda_{max}-\lambda_{min})/(N-1)$=0.1 nm.

Figure 13A:
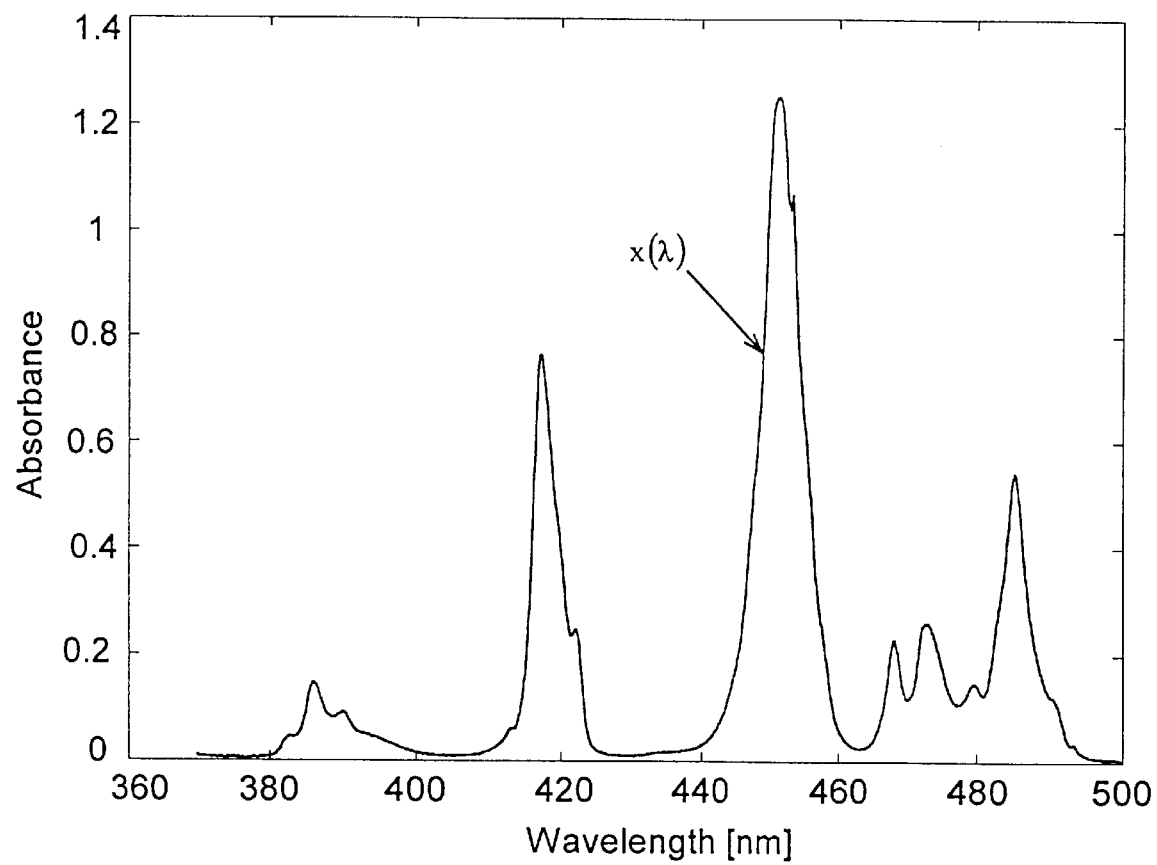
FIG. 13a is a graph of the spectrum of a standard holmium perchlorate sample.

The test data were acquired for a standard holmium perchlorate sample; its real spectrum $x(\lambda)$ is shown in FIG. 13a. The known parameters of this spectrum are as follows:

the vector of the positions of peaks:

l=[382.7 386 390.1 417 422 451.2 468.1 473 479.5 485.1 491]$^T$ the vector of the magnitudes of peaks:

a=[0.0483 0.1492 0.0938 0.766 0.2481 1.2513 0.2292 0.2595 0.1475 0.5419 0.1073]$^T$

The idealized spectrum of a sample under study is assumed to have the form:

$$s(\lambda; l, a) = \sum_{k=1}^{11} a_k v_s(\lambda, l_k)$$

with the peaks defined by:

$v_s(\lambda,l)=\delta(\lambda-l)$ for $l\in[\lambda_{min},\lambda_{max}]$

Figure 13B:
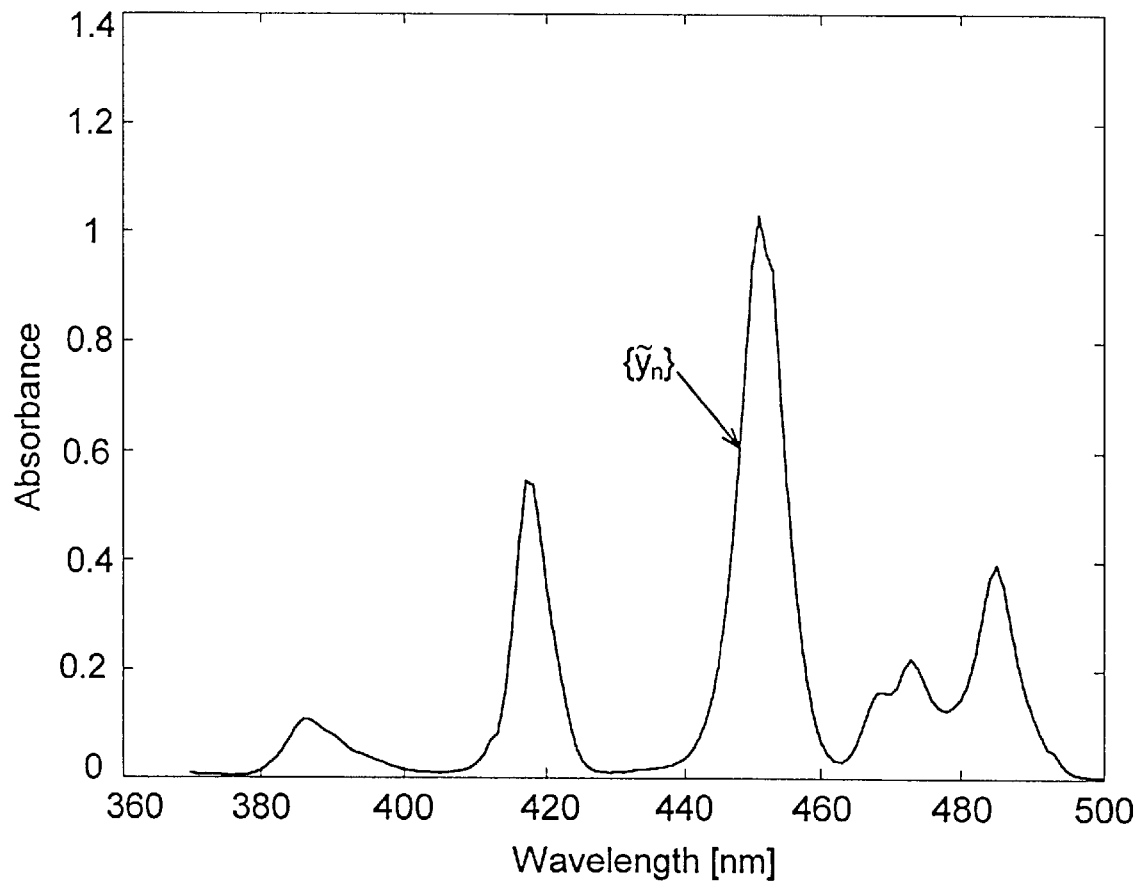
FIG. 13b is a graph of acquired data representative of $x(\lambda)$, acquired by means of a spectrophotometer.

The set of data representative of $x(\lambda)$, acquired by means of the spectrophotometer, $\{\tilde{y}_n\}\equiv\{\tilde{y}_n|n=1,\ldots,6002\}$, is shown in FIG. 13b.

Figure 14A:
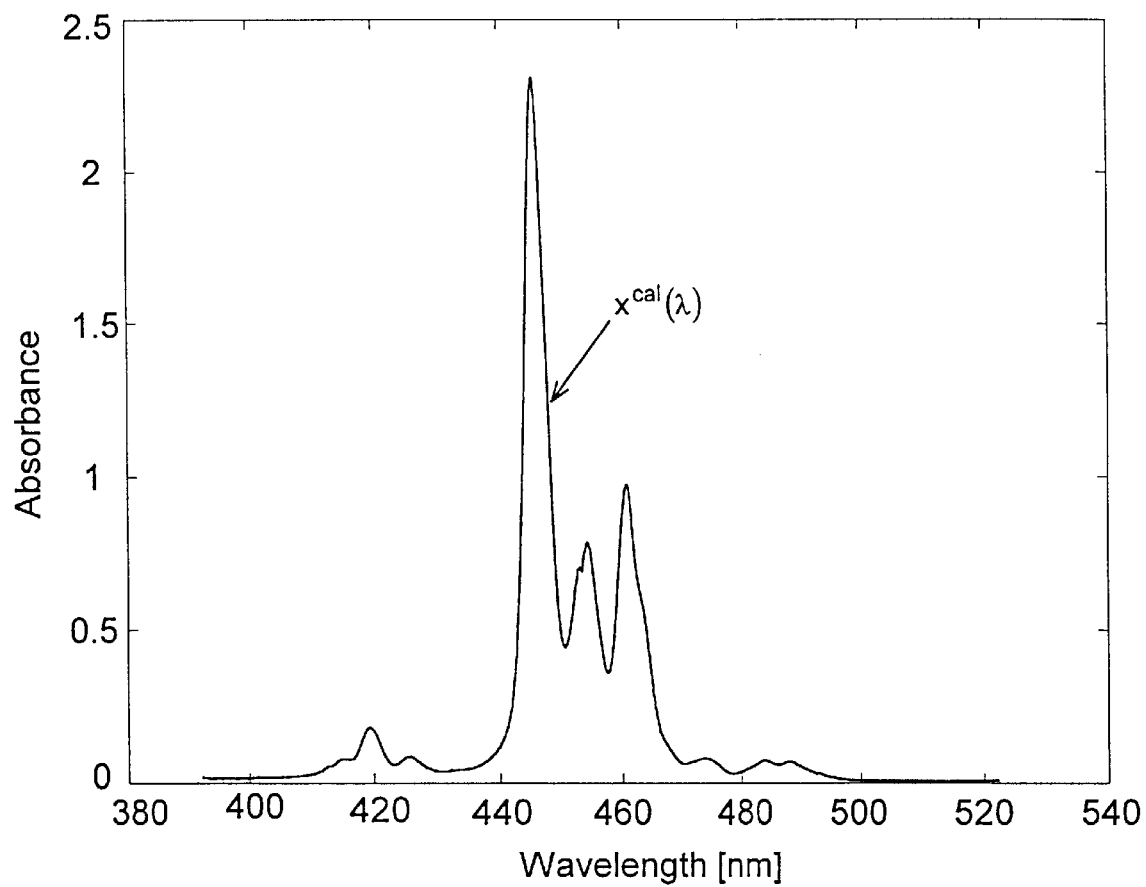
FIG. 14a is a graph of the spectrum of a standard holmium oxide filter sample.

The calibration data were acquired for a standard holmium oxide sample; its spectrum $x^{cal}(\lambda)$ is shown in FIG. 14a. The parameters of this spectrum are as follows:

the vector of the positions of peaks:

$l^{cal}$=[415.2 419.2 425.5 445.5 454.2 460.7 473.7 484 488.4]$^T$;

the vector of the magnitudes of peaks:

$a^{cal}$=[0.0799 0.1813 0.0868 2.313 0.7862 0.9772 0.0815 0.076 0.0709]$^T$.

The idealized spectrum of a sample used for calibration $s(\lambda;l^{cal},a^{cal})$ is assumed to have the form:

$$s(\lambda; l^{cal}, a^{cal}) = \sum_{k=1}^{9} a_k^{cal} v_s(\lambda, l_k^{cal})$$

Figure 14B:
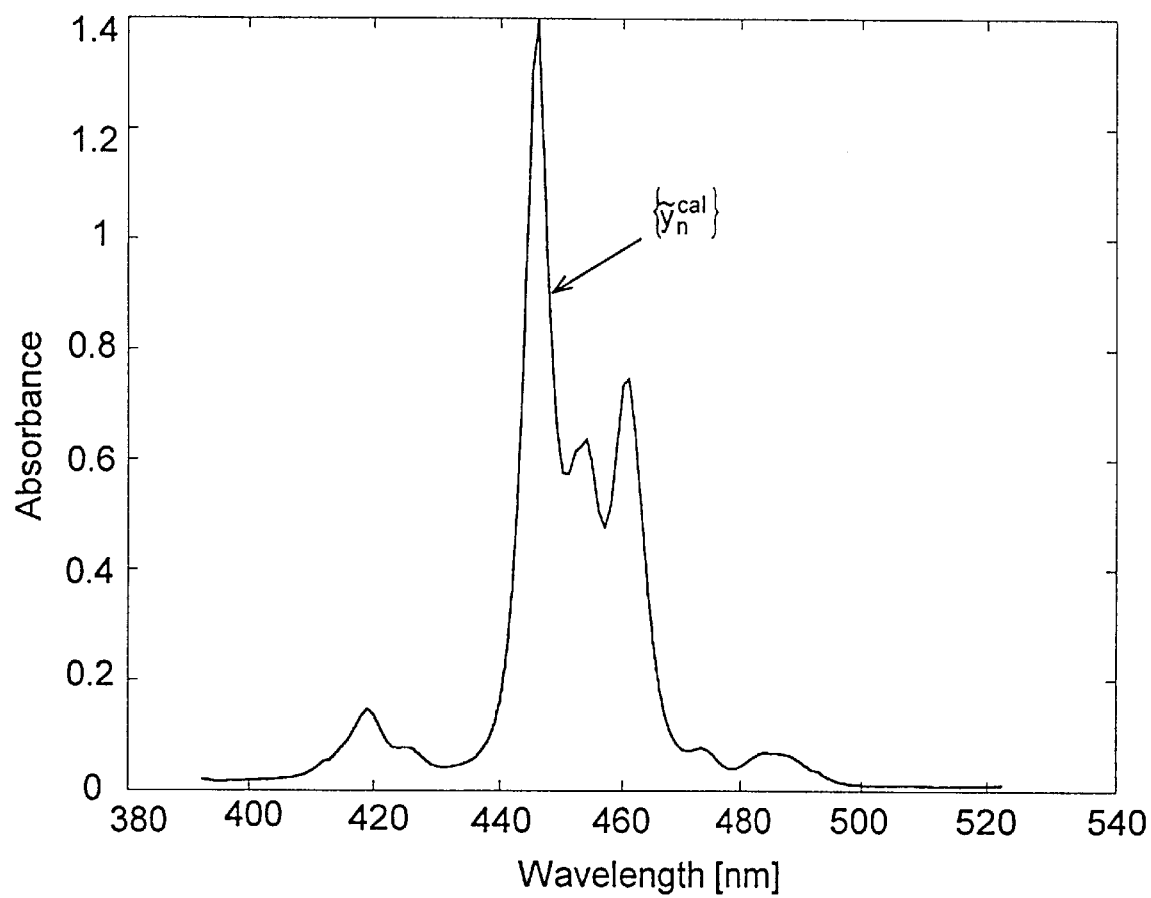
FIG. 14b is a graph of the data $\{\tilde{y}_n^{cal}\}$, used for calibration.

The set of data representative of $x^{cal}(\lambda)$, acquired by means of the spectrophotometer, $\{\tilde{y}_n^{cal}\}\equiv\{\tilde{y}_n^{cal}|n=1,\ldots,6002\}$, is shown in FIG. 14b.

The chosen operator of projection, for mapping an idealized spectrum $s(\lambda;l,a)$ into the data space $\{\tilde{y}_n\}=G[s(\lambda;l,a);p_G]$ is defined by the following operations:

$$x(\lambda) = \exp\left[\int_{-\infty}^{+\infty} g_{sx}(\lambda - \lambda')\ln[s(\lambda'; l, a)] d\lambda'\right]$$

$$y(\lambda) = \int_{-\infty}^{+\infty} g_{xy}(\lambda - \lambda')x(\lambda') d\lambda'$$

$\hat{y}_n = y(\lambda_n)$ for $n = 1, \ldots, N$

The function $g_{xy}(\lambda)$ is estimated to have the form of the Gauss function:

$$g_{xy}(\lambda) = \frac{1}{\sqrt{2\pi\sigma_{xy}}} \exp\left(-\frac{\lambda^2}{2\sigma_{xy}^2}\right)$$

Consequently, the vector of the parameters $p_G$ of the operator G contains discrete values of $g_{sx}(\lambda)$ and parameter $\sigma_{xy}$.

The chosen operator of reconstruction, for transforming the data $\{\tilde{y}_n\}$ into an estimate $\hat{s}(\lambda)$ of $s(\lambda;l,a)$, $\hat{s}(\lambda)=R[\{\tilde{y}_n\};p_R]$, is specified by the following steps:
   a discrete estimate $\{\hat{x}_n\}$ of $x(\lambda)$ is found by means of a rational filter applied to the data $\{\tilde{y}_n\}$; and,
   an estimate $\hat{s}(\lambda)$ of $s(\lambda;l,a)$ is computed using a spline-based Kalman filter applied to $\{\hat{x}_n\}$.

The vector $p_R=[p_{R,1} p_{R,2} \ldots ]^T$ of parameters of the operator R contains coefficients of the rational filter as well as discrete values of the function $g_{sx}(\lambda)$ and regularization parameters for the spline-based Kalman filter.

The following operations are performed during calibration:
   identification of a function $g_{sx}(\lambda)$, using an iterative algorithm such as the Jansson's algorithm described in P. A. Jansson, Ed., Deconvolution of spectra and images, Academic Press. Inc. (1997);
   estimation of parameter $\sigma_{xy}$ of function $g_{xy}(\lambda)$ based on the ideal spectrum $x^{cal}(\lambda)$ using an optimization algorithm;
   estimation of coefficients of the rational filter using an optimization algorithm; and,
   estimation of a regularization parameter of the spline-based Kalman filter, using an optimization algorithm.

Figure 15A:
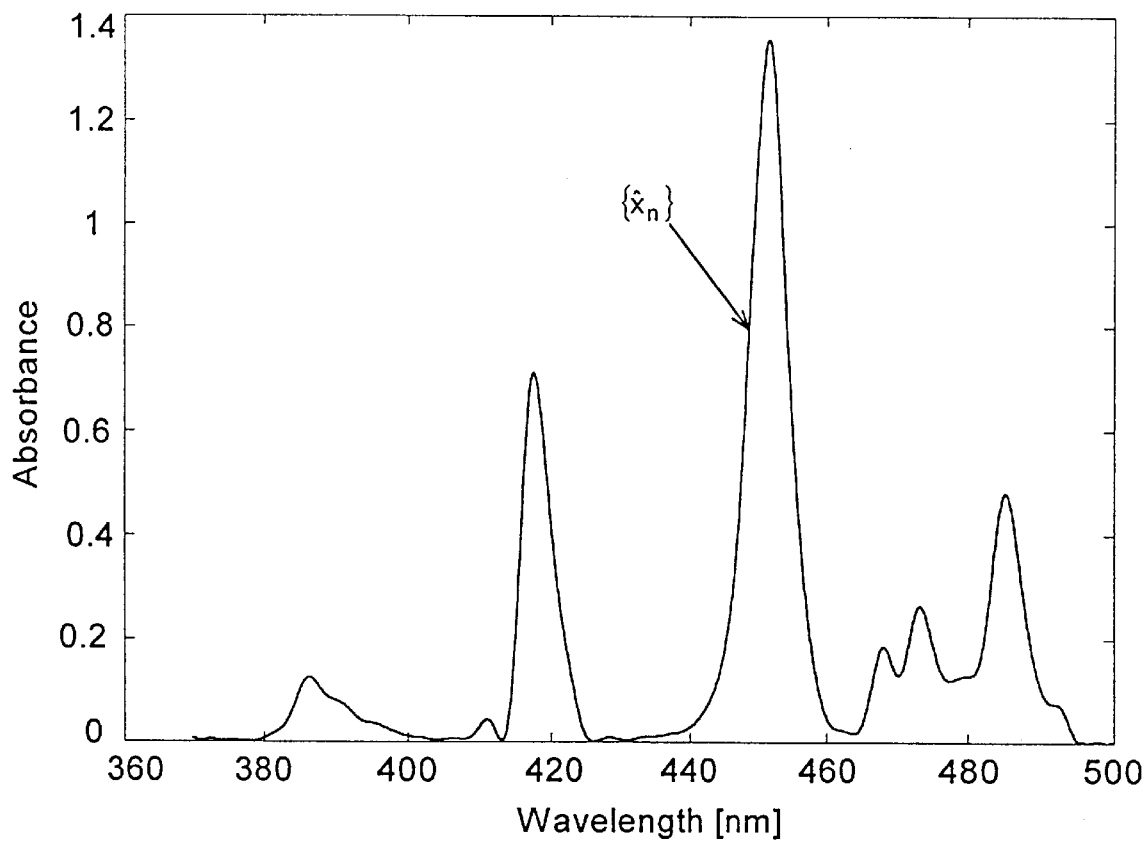
FIG. 15a, FIG. 15b and FIG. 16 show exemplary results of spectrometric data resolution enhancement and spectral correction obtained by means of a method according the invention.
Figure 15B:
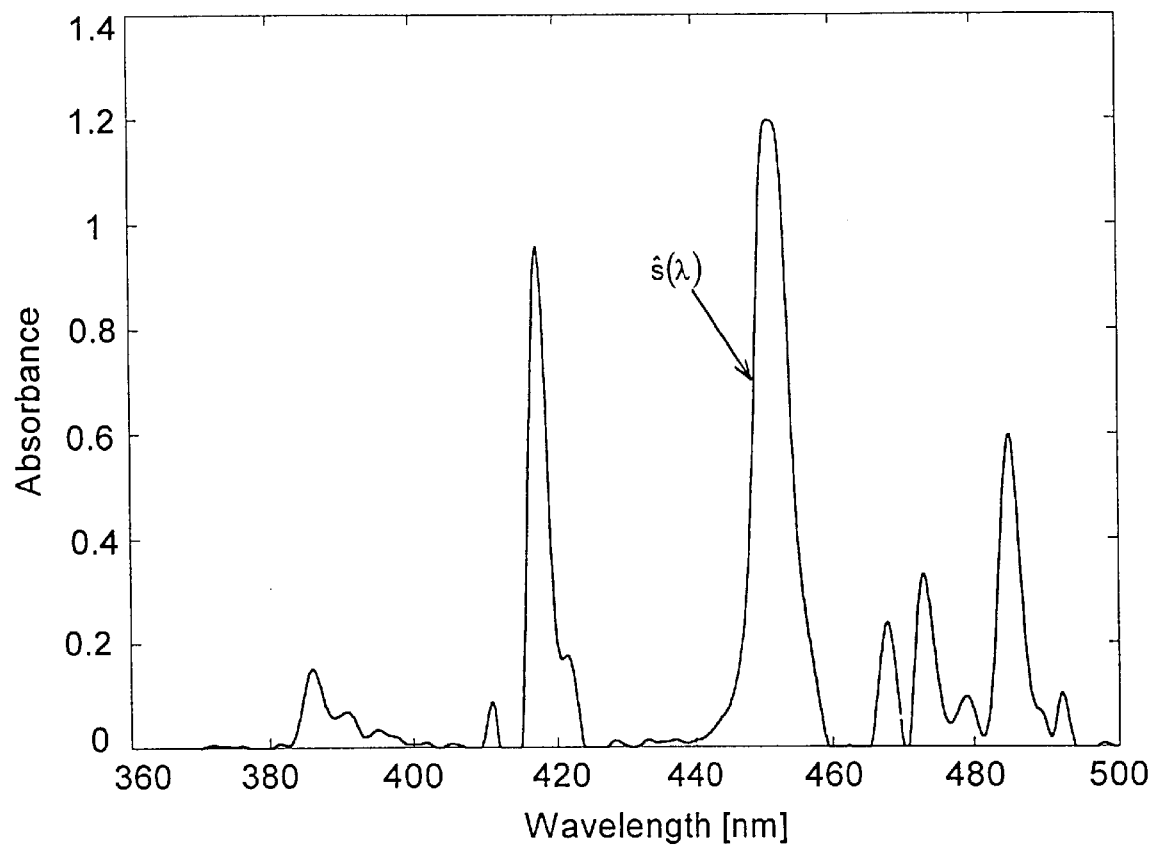
Figure 16:
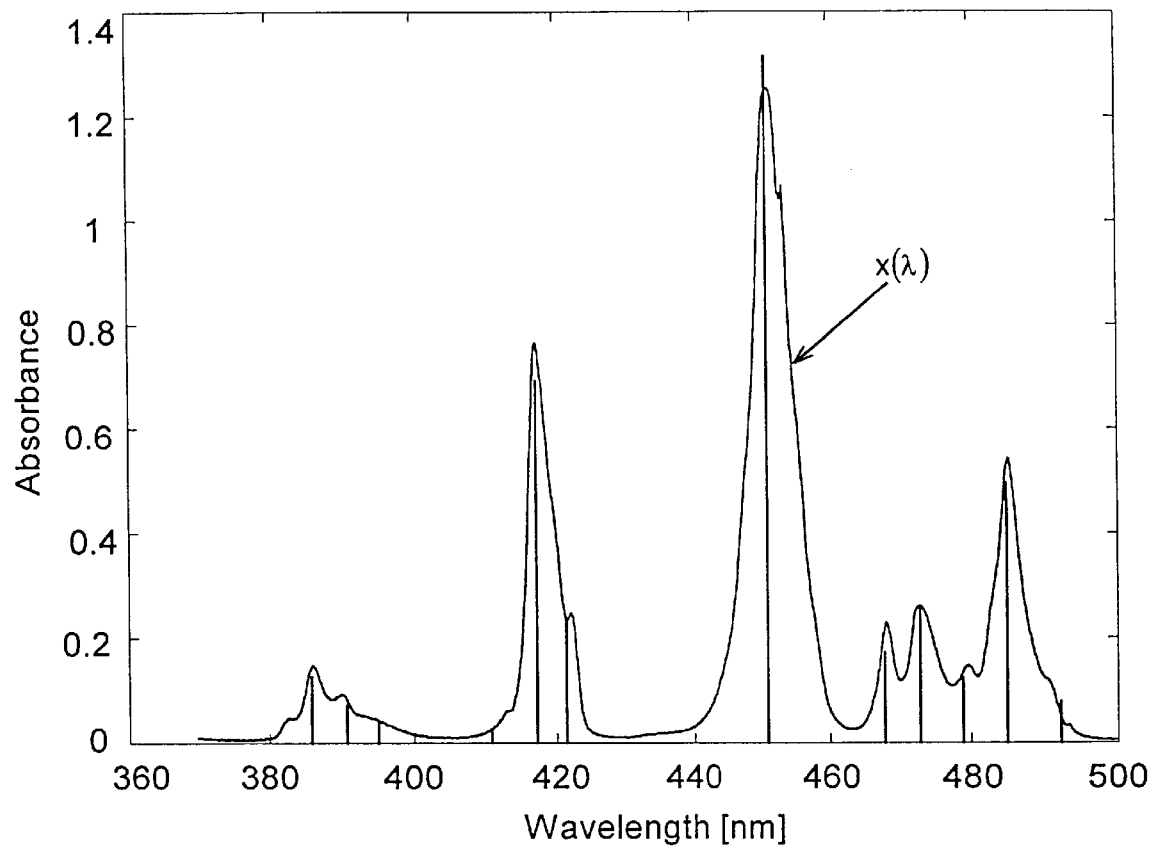

The exemplary results of spectrophotometric data resolution augmentation obtained by means of this exemplary method are shown in FIG. 15a, FIG. 15b and FIG. 16. The estimates of test spectrum parameters obtained by means of the present method, are as follows:

the vector of the positions of peaks:

$\hat{l}$=[386 390.8 395.1 410.8 417.2 421.4 451.1 468 473.1 479 485 492.2]$^T$ the vector of the magnitudes of peaks:

â=[0.1276 0.0738 0.0376 0.0243 0.6932 0.235 1.3142 0.1729 0.2593 0.1239 0.4937 0.079]$^T$

As is evident to those of skill in the art, application of a method as herein described allows for capturing of spectral information using low-resolution optical components. This allows for miniaturisation of optical components used in spectral sensing applications because, through resolution augmentation, useful information is extracted from the captured spectra.

The proposed method of spectral resolution augmentation is applicable in virtually all branches of spectroscopy. The motivation for its application in a given measurement situation is founded on expected gains. Examples of some expected gains include the following. Increased accuracy of spectrometric analyses is accomplished by a given spectrometric system. The increased accuracy results from correction of instrumental errors and reduced uncertainty of estimation of parameters of measured spectra. Reduced costs of spectrometric analyses with a given accuracy is achieved by replacing a high-resolution spectrometric transducer with a functionally equivalent but low-resolution instrument. Increased reliability and informativeness of spectrometric analyses results from parallel utilization of a network of low-cost spectrometers served by a common computing resource. This replaces the conventional autonomous spectrometer having a dedicated processing resource. Dimensions of spectrometers and spectrometer-related measurement tools are reduced because software replaces some functions currently implemented using optical processing and because compensation of hardware imperfections caused by miniaturisation of optical components is achieved.

Many variations of operators and mathematical models or algorithms are useful in a method according to the invention. Though the above description is with respect to a single set of equations for augmenting resolution of a spectrum, other equations are also applicable. Some examples of other approaches for augmenting spectra according to the present invention are described below.

Optionally, the following mathematical models of the spectrometric data may be used for defining the operator G where the corresponding operators G are set out below:

a) the stationary linear model:

$$y(\lambda) = \int_{-\infty}^{+\infty} g(\lambda - \lambda')s(\lambda'; l, a)d\lambda';$$

b) the non-stationary linear model:

$$y(\lambda) = \int_{-\infty}^{+\infty} g(\lambda, \lambda')s(\lambda'; l, a)d\lambda'; \text{ and,}$$

c) the non-linear model, e.g.:

$$y(\lambda) = \int_{-\infty}^{+\infty} g(\lambda, \lambda')F_s[s(\lambda'; l, a)]d\lambda'$$

$$y(\lambda) = F_y\left[\int_{-\infty}^{+\infty} g(\lambda, \lambda')F_s[s(\lambda'; l, a)]d\lambda'\right]$$

where $g(\lambda)$ and $g(\lambda,\lambda')$ are the apparatus functions of the spectrometric apparatus; $F_s$ and $F_y$ are non-linear functions.

The corresponding operators G have the following forms:
a) the operator corresponding to the stationary linear model:

$$\hat{y}_n = \sum_v p_{Gn,v} \int_{\lambda_v}^{\lambda_{v+1}} s(\lambda'; l, a)d\lambda'$$

where $p_{Gn,v} = g\left(\frac{\lambda_{v+1} + \lambda_v}{2}\right)\Delta\lambda;$ b) the operator corresponding to the non-stationary linear model:

$$\hat{y}_n = \sum_v p_{Gn,v} \int_{\lambda_v}^{\lambda_{v+1}} s(\lambda'; l, a)d\lambda'$$

where $p_{Gn,v} = g\left(\lambda_n, \frac{\lambda_{v+1} + \lambda_v}{2}\right)\Delta\lambda;$ and, c) the operator corresponding to the exemplary non-linear models:

$$\hat{y}_n = \sum_v p_{Gn,v} \int_{\lambda_v}^{\lambda_{v+1}} F_s[s(\lambda'; l, a)]d\lambda'$$

$$\hat{y}_n = F_y\left[\sum_v p_{Gn,v} \int_{\lambda_v}^{\lambda_{v+1}} F_s[s(\lambda'; l, a)]d\lambda'\right]$$

where $p_{Gn,v} = g\left(\lambda_n, \frac{\lambda_{v+1} + \lambda_v}{2}\right)\Delta\lambda.$ Optionally, the following methods of signal reconstruction in the form of deconvolution or generalized deconvolution are used for defining the operator R:
a) the original domain, numerical differentiation-based method as described by Morawski & Sokolowski in 1995;
b) the iterative methods of Jansson and Gold;
c) the spectrum-domain, Tikhonov-regularization-based method;
d) the cepstrum-domain, Tikhonov-regularization-based method;
e) the original-domain, Tikhonov-regularization-based method with the positivity constraint imposed on the solution;
f) the Kalman-filter-based method with the positivity constraint imposed on the solution;
g) the Kalman-filter-based method with spline-approximation of the solution;
h) the adjoint-operator method as described by Morawski & Pawinski in 1995;
i) the entropy-based variational method;
j) the Volterra-series-based methods;
k) the rational-filter-based method as described by Szczecinski et al. in 1997.

Moreover, many other methods developed in the domain of chemometrics such as those of Brown et al.; telecommunications, seismology and image processing are applicable with the method according to the invention for spectral resolution augmentation. Selection of mathematical algorithms for use in the present invention is straightforward for one of skill in the art without undue experimentation.

The following methods may be used for determining the regularization parameters of the operator R:
a) the discrepancy principle with a pre-estimate of the variance of measurement errors in the data as described by Tikhonov et al. In 1995;
b) the method of the L-curve as described by Hansen & O'Leary in 1991;
c) the method of additional set of calibration data as described by Szczeciński et al. in 1995.

Calibration is also described above with relation to an exemplary embodiment thereof.

Optionally, the isolated peak $v_s(\lambda,l)$ is assumed to have the following forms:
a) the Dirac distribution $\delta(\lambda)$ for all values of l;
b) a triangle whose width is constant or varying versus l;
c) a rectangle whose width is constant or varying versus l;
d) a Gauss function whose width is constant or varying versus l; and,
e) a Lorenz function whose width is constant or varying versus l.

Optionally, at least one of the following methods is used for estimation of the apparatus function $g(\lambda)$:
a) smoothing approximation applied directly to the data $\{\tilde{y}_n^{cal}\}$ if the isolated peak $v_s(\lambda,l)$ is assumed to have the form of the Dirac distribution $\delta(\lambda)$;
b) deconvolution of the data $\{\tilde{y}_n^{cal}\}$ with respect to $s(\lambda;l^{cal},a^{cal})$; and
c) subsequent use of deconvolution and smoothing approximation.

Optionally, at least one of the following methods may be used for determining other parameters of the operator R:
a) a direct transformation of the parameters of the operator G;
b) the minimization of any norm of the solution $\|p_R\|$ under constraints imposed on another norm of the discrepancy $\|s(\lambda;l^{cal},a^{cal})-R[\{\tilde{y}^{ncal}\};p_R]\|$
c) the minimization of any norm of the discrepancy $\|s(\lambda;l^{cal},a^{cal})-R[\{\tilde{y}_n^{cal}\};p_R]\|$ under constraints imposed on another norm of the solution $\|p_R\|$.

Optionally, at least one of the following methods is used for estimation of magnitudes a of peaks, given the estimates $\hat{l}$ of their positions l:

$$\hat{a}=\arg_a\inf\{\|\{\tilde{y}_n\}-G[s(\lambda;\hat{l},a);p_G]\|_q|a\in A\};$$

and $$\hat{a}=\arg_a\inf\{\|\hat{s}(\lambda)-s(\lambda;\hat{l},a)\|_q|a\in A\}$$

with A—being a set of feasible solutions; options: q=2 and $A \subset R^k$; q=$\infty$ and $A \subset R^k$; q=2 and $A \subset R_+^k$; q=$\infty$ and $A \subset R_+^k$. Some examples of algorithmic solutions are given in Deming S. N., Morgan S. L.: *Experimental Design: A Chemometric Approach*, Elsevier 1987; Fraser R. D. B., Suzuki E.: "Biological Applications". In: *Spectral Analysis—Methods and Techniques* (ed by J. A. Balckburn), M. Dekker, 1970, pp. 171–211; Fister III J. C., Harris J. M.: "Multidimensional Least Squares Resolution of Excited State Raman Spectra", *Anal. Chem.*,Vol. 67, No. 4, 1995b, pp. 701–709; Fister III J. C., Harris J. M.: "Multidimensional Least Squares Resolution of Raman Spectra from Intermediates in Photochemical Reactions", *Anal. Chem.*, Vol. 67, No. 8, 1995a, pp. 1361–1370; Goodman K. J., Brenna T.: "Curve Fitting for Restoration of Accuracy of Overlapping Peaks in Gas Chromatography/Combustion Ratio Mass Spectrometry", *Anal. Chem.*, Vol. 66, No. 8, 1994, pp. 1294–1301; Miekina et al, "Incorporation of the Positivity Constraint into a Tikhonov-method-based Algorithm of Measurand Reconstruction". *Proc. IMEKO-TC1&TC7 Colloquium (London, UK, Sep. 8–10, 1993)*, pp. 299–304 and so forth. A particularly effective solution of the above optimization problem is based on a non-stationary Kalman filter or an adaptive LMS algorithm as described in Ben Slima M., Szczecinski L., Massicotte D., Morawski R. Z., Barwicz A.: "Algorithmic Specification of a Specialized Processor for Spectrometric Applications",*Proc. IEEE Instrum. & Meas. Technology Conf. (Ottawa, Canada, May 19–21, 1997)*, pp. 90–95 and in Ben Slima M., Morawski R. Z., Barwicz A.: "Kalman-filter-based Algorithms of Spectrophotometric Data Correction—Part II: Use of Splines for Approximation of Spectra", *IEEE Trans. Instrum. & Meas.*, Vol. 46, No. 3, June 1997, pp. 685–689.

Optionally, methods for estimation of the magnitudes a are used for iterative correction of estimates of magnitudes a and positions l of the peaks. Known methods include the following:

$$\hat{l}=\arg_l\inf\{\|\{\tilde{y}_n\}-G[s(\lambda;l,\hat{a});p_G]\|_q|l\in L\}$$

and, $$\hat{l}=\arg_l\inf\{\|\hat{s}(\lambda)-s(\lambda;l,\hat{a})\|_q|l\in L\}$$

with L being a set of feasible solutions; options: q=2 and $L \subset R_k$; q=$\infty$ and $L \subset R^k$; q=2 and $L \subset R_+^k$; q=$\infty$ and $L \subset R_+^k$.

According to the method set out above, the data are pre-processed. The pre-processing is performed according to known techniques and for known purposes with relation to the methods selected for augmenting resolution of the spectral data and the sensor with which the pre-processing is used. Optionally, one of the following methods is used for normalization of data:
a) the linear or nonlinear transformation of the $\lambda$-axis, aimed at diminishing the non-stationarity effects in the data;
b) the linear or nonlinear transformation of the y-axis, aimed at diminishing the non-linearity effects in the data;
c) the linear or nonlinear transformation of the $\lambda$-axis and y-axis, aimed at diminishing the non-stationary and non-linearity effects in the data.

Optionally, one of the following methods may be used for smoothing the data:
a) the linear, FIR-type or IIR-type, filtering;
b) the median filtering;
c) the smoothing approximation by cubic splines;
d) the deconvolution with respect to an identity operator.

Baseline correction is performed according to standard known techniques such as those described in Brame E. G., Grasselli J., *Infrared and Raman Spectroscopy*, Marcel Dekker 1976.

Though the method of augmenting resolution and accuracy of a spectrum from a low resolution captured spectrum according to the invention is described with reference to any hardware implementation of this method, it is preferred that the method is implemented in an integrated hardware device as described herein.

Figure 17:
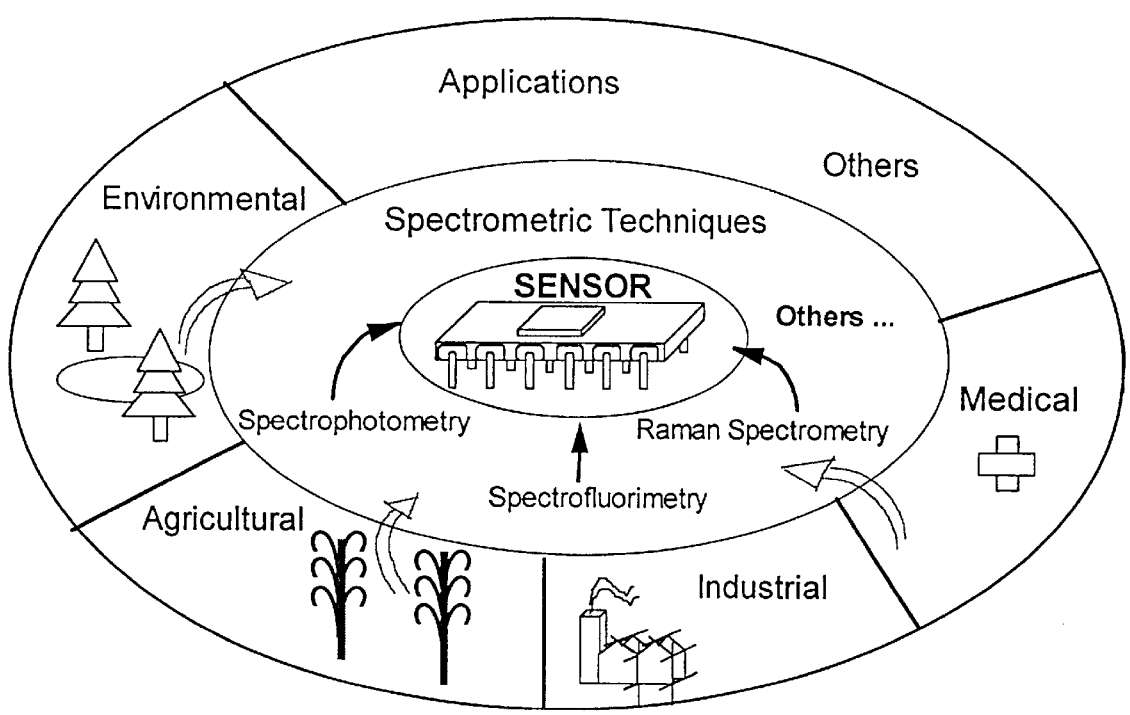
FIG. 17 presents a diagram illustrating applications of the IISS/T.

Referring to FIG. 17, a summary of potential applications of the IISS/T in various fields of application is presented. The IISS/T (in the center of the figure) is applied using different spectrometric techniques, which are used in analytical laboratories. The use of an IISS/T according to the invention facilitates application of spectrum-measurement-based methods in real-time environmental, agricultural, medical, and industrial monitoring. It also facilitates use of a hand-held spectrometer designed for specific applications or for a variety of applications.

The proposed invention permits implementation of sensors that are advantageous in many ways including the following. The proposed IISS/T is autonomous in the sense, that it is capable of producing output measurement results without external operations and/or computing. The IISS/T architecture supports manufacturing of various low-price intelligent spectrometric probes and hand-held spectrometric instruments without some of the technological problems inherent in high-resolution optical processing spectrometers. The proposed IISS/T is easily adapted to diverse applications by reprogramming the specialized digital signal processor. The proposed method for spectrum measurement is particularly advantageous for integrated miniature implementation of the IISS/T. The IISS/T is robust to mechanical, electromagnetic, chemical and biological influences, due to its compact packaging and integrated design. Further, it is less cumbersome for transport, installation, testing, and repair.

In a pre-defined specialized application, the metrological parameters—variety and ranges of measured quantities, as well as accuracy of measurement—of the IISS/T are comparable to those of a general-purpose laboratory spectrophotometers; yet, the IISS/T has a significantly lower manufacturing cost. Using current technology, an IISS/T is manufacturable as small as 12 cm$^3$. For this reason the IISS/T is naturally adapted for in situ measurements. A network of deployed IISS/T may replace the vehicle-based system of sampling, currently used in the environmental monitoring. Alternatively, a network of low-resolution sensors coupled with a single processor is useful for random sampling sequential sampling, or, when the processor is significantly more powerful than necessary for augmenting resolution and accuracy of a single spectrum, for simultaneous sampling. The main advantage of this solution would be an increase in the reliability and informativeness of environmental monitoring due to the continual sampling in situ. Such a network of IISS/T is useful in chemical, pharmaceutical and biotechnological industries for continual monitoring of manufacturing processes. The main advantage of this solution within those industries is an increase in the reliability and safety of manufacturing processes, as well as an improvement of the quality of production.

Without the digital processor performing, spectral augmentation, no useful measurement results are obtained. This is distinct from existing spectral transducers having optical processing, the results of which are provided to an external processor for spectral analysis such as noise filtering and so forth.

The price of an IISS/T manufactured according to an embodiment of the invention, using standard integration technologies, is comparable with the price of a semiconductor device than that of classic spectrometer. The availability of such an IISS/T will change the approach to the use of light-spectrum-measurement-based techniques, currently limited to the laboratory environment for practical purposes. This invention provides a method of implementing a spectrometer for use in situ in many metrological applications.

Clearly use of the exemplary method described herein is not limited to the IISS/T. The method of spectral correction and resolution augmentation described above is useful in many applications other than a hand-help spectrometer. For example, in high precision measurement of spectra or in the design of lower cost high precision spectrometers. Similarly, the exemplary method of spectral enhancement performed in the processor of the IISS/T as described above, is an exemplary method of enhancing spectral accuracy and resolution. It is exemplary in nature and not intended to limit the scope of the inventive apparatus.

The exemplary embodiment of the invention presented above is not intended to limit the applicability of the method to the presented example. Neither is it intended to limit the variety of algorithms that may be used to embody the operations of the specialized digital signal processor. Numerous other embodiments may be envisaged without departing from the spirit or scope of the invention.

What is claimed is:

1. A method of spectral measurement comprises the steps of:
    capturing data representative of a first spectrum of a sample using a spectral transducer;
    comparing the data representative of the first spectrum to data representative of a known spectrum for a sample substantially identical to the first sample and determining calibration data for transforming, according to a determined transformation, the data representative of the first spectrum into an approximation of the data representative of the known spectrum;
    capturing data representative of a spectrum of a second sample using the spectral transducer; and,
    estimating an ideal spectrum for the second sample using the calibration data, the estimation performed using the determined transformation.

2. The method of spectral measurement as defined claim 1 wherein the spectral transducer has a resolution R>5 nm.

3. The method of spectral measurement as defined claim 1 wherein the spectral transducer has a resolution R, 1 nm$\leq$R$\leq$15 nm.

4. A method of spectral measurement as defined in claim 1 wherein
    the data representative of the first spectrum is defined by $\{\tilde{y}_n^{cal}\}$,
    the known spectrum is defined by $x^{cal}(\lambda)$, and
    wherein the calibration data is determined by the steps of:
    choosing a form of an ideal peak $v_s(\lambda,l)$ and of projection operator $\mathcal{G}$ and reconstruction operator $\mathcal{R}$
    pre-processing the data representative of the first spectrum $\{\tilde{y}_n^{cal}\}$;
    determining parameters $p_\mathcal{G}$ of projection operator $\mathcal{G}$ and parameters $p_\mathcal{R}$ of reconstruction operator $\mathcal{R}$; and,
    storing calibration data comprising the determined parameters in memory.

5. A method of spectral measurement as defined in claim 1 wherein the step of estimating the ideal spectrum comprises the steps of:
    estimating positions l of peaks within a spectrum of the second sample on the basis of an estimate $\hat{s}(\lambda)$ of $s(\lambda;l,a)$;
    estimating magnitudes a of the peaks; and,
    iteratively correcting the estimates of the parameters of the peaks.

6. A method of spectral measurement as defined in claim 5 wherein the steps of estimation of the magnitudes a and iterative correction of estimates of magnitudes a and positrons l of the peaks is performed using one of the following:

$$\hat{l} = \arg_l \inf \{ \|\{\tilde{y}_n\} - G[s(\lambda;l,\hat{a});p_G]\|_q | l \in L \}$$

and, $$\hat{l} = \arg_l \inf \{ \|\hat{s}(\lambda) - s(\lambda;l,\hat{a})\|_q | l \in L \}$$

with L being a set of feasible solutions having the following options: q=2 and $L \subset R^k$; q=∞ and $L \subset R^k$; q=2 and $L \subset R_+^k$; q=∞ and $L \subset R_+^k$.

7. A method of spectral measurement as defined in claim 1 comprising the step of preprocessing the data representative of the first spectrum.

8. A method of spectral measurement as defined in claim 7 wherein the step of preprocessing includes a step of normalising the data representative of the first spectrum.

9. A method of spectral measurement as defined in claim 7 wherein the step of preprocessing includes a step of smoothing the data representative of the first spectrum.

10. A method of spectral measurement as defined in claim 7 wherein the step of preprocessing includes a step of performing baseline correction.

11. A method of spectral measurement as defined in claim 1 wherein the calibration data comprising a mathematical transform of captured spectral data, said mathematical transform for converting the data into an approximation of the ideal spectral data.

12. A method of spectral measurement as defined in claim 1 wherein the calibration data comprises information relating to defects in the spectral transducer.

13. A method of spectral measurement as defined in claim 1 wherein the data captured by the spectral transducer includes insufficient information for a specific task and wherein the estimated ideal spectrum includes sufficient information for said task.

14. A method spectral measurement as defined in claim 1 wherein the spectral transducer is a low-resolution spectral transducer.

15. A method of spectral measurement as defined in claim 1 wherein the estimated ideal spectrum has a resolution of at least 5 times the resolution of the spectral transducer.

16. A method of spectral measurement as defined in claim 1 wherein the estimated ideal spectrum has a resolution of at least 10 times the resolution of the first spectral transducer.

17. A method of spectral measurement as defined in claim 1 wherein the step of estimating an ideal spectrum for the second sample using the calibration data, the estimation performed using the determined transformation results in an estimated spectrum, the estimated spectrum corrected for imperfections in the spectral transducer.

18. A method of spectral measurement as defined in claim 17 comprising the step of:

estimating parameters l and a on the basis of an estimate $\hat{s}(\lambda)$ of the second spectrum $s(\lambda;l,a)$.

* * * * *